(12) United States Patent
Mullins et al.

(10) Patent No.: US 11,120,345 B2
(45) Date of Patent: Sep. 14, 2021

(54) METHOD, APPARATUS, AND COMPUTER PROGRAM PRODUCT FOR DETERMINING CLOSING METRICS

(71) Applicant: Groupon, Inc., Chicago, IL (US)

(72) Inventors: Brian Mullins, Chicago, IL (US); Matt DeLand, San Francisco, CA (US); Zahra Ferdowsi, Chicago, IL (US); Stephen Lang, Chicago, IL (US); John Stokvis, Chicago, IL (US); Nolan Finn, Chicago, IL (US); Shafiq Shariff, Chicago, IL (US)

(73) Assignee: GROUPON, INC., Chicago, IL (US)

(*) Notice: Subject to any disclaimer, the term of this patent is extended or adjusted under 35 U.S.C. 154(b) by 1053 days.

(21) Appl. No.: 15/667,666

(22) Filed: Aug. 3, 2017

(65) Prior Publication Data

US 2018/0046925 A1 Feb. 15, 2018

Related U.S. Application Data

(63) Continuation of application No. 15/051,165, filed on Feb. 23, 2016, now Pat. No. 10,558,922, which is a
(Continued)

(51) Int. Cl.
*G06Q 30/02* (2012.01)
*G06N 5/04* (2006.01)
(Continued)

(52) U.S. Cl.
CPC ............... *G06N 5/04* (2013.01); *G06N 5/02* (2013.01); *G06N 20/00* (2019.01); *G06N 20/10* (2019.01);
(Continued)

(58) Field of Classification Search
None
See application file for complete search history.

(56) References Cited

U.S. PATENT DOCUMENTS

| | | | |
|---|---|---|---|
| 6,058,371 A | 5/2000 | Djian | |
| 6,067,525 A | 5/2000 | Johnson et al. | |

(Continued)

FOREIGN PATENT DOCUMENTS

CA 2594001 C 9/2019

OTHER PUBLICATIONS

U.S. Provisional Application filed on Apr. 26, 2012; entitled Deal Meter; U.S. Appl. No. 61/639,067, U.S. Appl. No. 61/639,067.
(Continued)

*Primary Examiner* — Cory W Eskridge
(74) *Attorney, Agent, or Firm* — Alston & Bird LLP

(57) ABSTRACT

A method, apparatus and computer program product are provided for calculating closing metrics regarding a contract between a promotion service and provider. A promotional system may calculate a probability of closing, and an estimated time to close. The promotion service may offer a promotion to consumers for a discounted product or service, to be honored by the provider. A category, lead source, historical data, stage in sales, and/or size of the provider may be used in calculating a probability of close and/or time to close. An example method may comprise supplying a classifying model with a dataset, wherein the dataset comprises an identification of a provider and attributes corresponding to the provider and identifying a class of the provider in accordance with the plurality of corresponding attributes, wherein the identification is determined based on one or more patterns determinative of a return rate by the classifying model.

20 Claims, 21 Drawing Sheets

Related U.S. Application Data continuation of application No. 13/826,757, filed on Mar. 14, 2013, now Pat. No. 9,330,357.

(60) Provisional application No. 61/730,046, filed on Nov. 26, 2012, provisional application No. 61/709,623, filed on Oct. 4, 2012.

(51) Int. Cl.
    *G06N 5/02*      (2006.01)
    *G06N 20/00*     (2019.01)
    *G06Q 10/06*     (2012.01)
    *G06Q 30/06*     (2012.01)
    *G06N 20/10*     (2019.01)
    *G06Q 40/00*     (2012.01)

(52) U.S. Cl.
    CPC ....... *G06Q 10/067* (2013.01); *G06Q 10/0635* (2013.01); *G06Q 10/0639* (2013.01); *G06Q 10/06393* (2013.01); *G06Q 30/0201* (2013.01); *G06Q 30/0202* (2013.01); *G06Q 30/0609* (2013.01); *G06Q 40/00* (2013.01)

(56) References Cited

U.S. PATENT DOCUMENTS

| | | |
|---|---|---|
| 6,850,895 B2 | 2/2005 | Brodersen et al. |
| 6,922,672 B1 | 7/2005 | Hailpern et al. |
| 7,092,929 B1 | 8/2006 | Dvorak et al. |
| 7,240,025 B2 | 7/2007 | Stone et al. |
| 7,340,410 B1 | 3/2008 | Vaillancourt et al. |
| 7,487,117 B1 | 2/2009 | Tamura et al. |
| 7,647,255 B2 | 1/2010 | Wang et al. |
| 7,720,708 B1 | 5/2010 | Elkins, II et al. |
| 7,769,628 B2 | 8/2010 | Mathews et al. |
| 7,917,387 B2 | 3/2011 | Spurr et al. |
| 8,001,058 B1 | 8/2011 | Harding |
| 8,010,404 B1 | 8/2011 | Wu et al. |
| 8,019,744 B1 | 9/2011 | Roizen et al. |
| 8,027,871 B2 | 9/2011 | Williams et al. |
| 8,135,607 B2 | 3/2012 | Williams et al. |
| 8,200,521 B2 | 6/2012 | Hader |
| 8,214,238 B1 | 7/2012 | Fairfield et al. |
| 8,249,942 B2 | 8/2012 | Mesaros |
| 8,478,650 B2 | 7/2013 | Ridley et al. |
| 8,533,038 B2 | 9/2013 | Bergh et al. |
| 8,600,843 B2 | 12/2013 | Bachman et al. |
| 8,725,597 B2 | 5/2014 | Mauseth et al. |
| 9,330,357 B1 | 5/2016 | Ferdowski |
| 9,378,511 B2 | 6/2016 | Chafle et al. |
| 9,563,900 B1 | 2/2017 | Guo et al. |
| 10,108,974 B1 | 10/2018 | Shariff et al. |
| 10,147,104 B1 | 12/2018 | Gregory et al. |
| 10,395,276 B1 | 8/2019 | Fulghum |
| 10,475,083 B1 | 11/2019 | Nkengla et al. |
| 10,504,126 B2 | 12/2019 | Kulkarni et al. |
| 2001/0032128 A1 | 10/2001 | Kepecs |
| 2001/0039514 A1 | 11/2001 | Barenbaum et al. |
| 2002/0042739 A1 | 4/2002 | Srinivasan et al. |
| 2002/0052820 A1 | 5/2002 | Gatto |
| 2002/0082892 A1 | 6/2002 | Raffel et al. |
| 2002/0099678 A1 | 7/2002 | Albright et al. |
| 2002/0138340 A1 | 9/2002 | Ikezawa et al. |
| 2002/0169654 A1 | 11/2002 | Santos et al. |
| 2002/0198756 A1 | 12/2002 | Ghaisas et al. |
| 2003/0046191 A1 | 3/2003 | Ferreri et al. |
| 2003/0065603 A1 | 4/2003 | Aihara et al. |
| 2003/0204498 A1 | 10/2003 | Lehnert |
| 2003/0220830 A1 | 11/2003 | Myr |
| 2004/0039624 A1 | 2/2004 | Ikezawa et al. |
| 2004/0093296 A1 | 5/2004 | Phelan et al. |
| 2004/0098467 A1 | 5/2004 | Dewey et al. |
| 2004/0143473 A1 | 7/2004 | Tivey et al. |
| 2005/0055275 A1 | 3/2005 | Newman et al. |
| 2005/0060242 A1 | 3/2005 | Armstrong et al. |
| 2005/0096963 A1 | 5/2005 | Myr et al. |
| 2005/0187818 A1 | 8/2005 | Zito et al. |
| 2005/0222886 A1 | 10/2005 | Sridharan |
| 2005/0251440 A1 | 11/2005 | Bednarek |
| 2005/0261951 A1 | 11/2005 | Tighe |
| 2005/0267828 A1 | 12/2005 | Baron et al. |
| 2006/0041500 A1 | 2/2006 | Diana et al. |
| 2006/0047559 A1 | 3/2006 | Jacoby et al. |
| 2006/0161534 A1 | 7/2006 | Carson, Jr. et al. |
| 2006/0212355 A1 | 9/2006 | Teague et al. |
| 2006/0287946 A1 | 12/2006 | Toms |
| 2007/0015518 A1 | 1/2007 | Winter et al. |
| 2007/0016508 A1 | 1/2007 | Lapointe et al. |
| 2007/0050276 A1 | 3/2007 | Mannion |
| 2007/0067267 A1 | 3/2007 | Ives |
| 2007/0087831 A1 | 4/2007 | Van et al. |
| 2007/0168131 A1 | 7/2007 | Root et al. |
| 2008/0021844 A1 | 1/2008 | Sanwal et al. |
| 2008/0154654 A1 | 6/2008 | Niessen et al. |
| 2008/0177615 A1 | 7/2008 | Chen-Ritzo et al. |
| 2008/0256061 A1 | 10/2008 | Chang et al. |
| 2008/0270209 A1 | 10/2008 | Mauseth et al. |
| 2008/0281756 A1 | 11/2008 | Riise et al. |
| 2008/0281858 A1 | 11/2008 | Aleksiejczyk et al. |
| 2008/0288481 A1 | 11/2008 | Zeng et al. |
| 2008/0294996 A1 | 11/2008 | Hunt et al. |
| 2008/0306781 A1 | 12/2008 | Gerlach et al. |
| 2008/0306812 A1 | 12/2008 | Bowen et al. |
| 2008/0313018 A1 | 12/2008 | Kamm et al. |
| 2009/0024402 A1 | 1/2009 | Delingat et al. |
| 2009/0048859 A1 | 2/2009 | McCarthy et al. |
| 2009/0119258 A1 | 5/2009 | Petty |
| 2009/0177540 A1 | 7/2009 | Quatse |
| 2009/0276296 A1 | 11/2009 | Spriegel |
| 2009/0281818 A1 | 11/2009 | Li et al. |
| 2010/0050201 A1 | 2/2010 | Kubota et al. |
| 2010/0082410 A1 | 4/2010 | Baudin et al. |
| 2010/0082413 A1 | 4/2010 | Huberman et al. |
| 2010/0082442 A1 | 4/2010 | Ma et al. |
| 2010/0094693 A1 | 4/2010 | Corke |
| 2010/0179704 A1 | 7/2010 | Ozog |
| 2010/0211455 A1 | 8/2010 | Williams et al. |
| 2010/0257012 A1 | 10/2010 | Walker et al. |
| 2011/0029382 A1 | 2/2011 | Narasimhan et al. |
| 2011/0087531 A1 | 4/2011 | Winters et al. |
| 2011/0112892 A1 | 5/2011 | Tarantino |
| 2011/0112897 A1 | 5/2011 | Tietzen et al. |
| 2011/0173059 A1 | 7/2011 | Benson |
| 2011/0184873 A1 | 7/2011 | Wilson et al. |
| 2011/0219073 A1 | 9/2011 | Lawler et al. |
| 2011/0225023 A1 | 9/2011 | Evens et al. |
| 2011/0231321 A1 | 9/2011 | Milne |
| 2011/0246255 A1 | 10/2011 | Gilbert et al. |
| 2011/0246260 A1 | 10/2011 | Gilbert et al. |
| 2011/0246274 A1 | 10/2011 | Mesaros |
| 2011/0246306 A1 | 10/2011 | Blackhurst et al. |
| 2011/0258067 A1 | 10/2011 | Rowell |
| 2011/0289106 A1 | 11/2011 | O'Brien |
| 2011/0307506 A1 | 12/2011 | Kass et al. |
| 2011/0313840 A1 | 12/2011 | Stolte |
| 2012/0010931 A1 | 1/2012 | Modani |
| 2012/0036009 A1 | 2/2012 | Aronowich et al. |
| 2012/0054001 A1 | 3/2012 | Zivkovic et al. |
| 2012/0054019 A1 | 3/2012 | Powter |
| 2012/0054020 A1 | 3/2012 | Jacobs |
| 2012/0066393 A1 | 3/2012 | Tekwani |
| 2012/0078721 A1 | 3/2012 | Dakka et al. |
| 2012/0084119 A1 | 4/2012 | Vandehey et al. |
| 2012/0123851 A1 | 5/2012 | Bax et al. |
| 2012/0123863 A1 | 5/2012 | Tao |
| 2012/0179476 A1 | 7/2012 | Muncy |
| 2012/0203708 A1 | 8/2012 | Green |
| 2012/0246015 A1 | 9/2012 | Bennett et al. |
| 2012/0259705 A1 | 10/2012 | Monteverde |
| 2012/0271660 A1 | 10/2012 | Faith |
| 2012/0278154 A1 | 11/2012 | Lange et al. |
| 2012/0291087 A1 | 11/2012 | Agrawal |
| 2012/0323634 A1 | 12/2012 | Harper et al. |

(56) References Cited

U.S. PATENT DOCUMENTS

| | | |
|---|---|---|
| 2012/0330720 A1 | 12/2012 | Barel |
| 2012/0330772 A1 | 12/2012 | Choe et al. |
| 2013/0006916 A1 | 1/2013 | Wang |
| 2013/0013345 A1* | 1/2013 | Wallquist .............. G06Q 40/08 705/4 |
| 2013/0013404 A1 | 1/2013 | Dailey |
| 2013/0030872 A1 | 1/2013 | Oksman |
| 2013/0036069 A1 | 2/2013 | Hsieh |
| 2013/0046574 A1 | 2/2013 | Griep et al. |
| 2013/0054369 A1 | 2/2013 | Grigg et al. |
| 2013/0066885 A1 | 3/2013 | Komuves |
| 2013/0073381 A1 | 3/2013 | Binkley |
| 2013/0080239 A1 | 3/2013 | Okerlund |
| 2013/0101110 A1 | 4/2013 | Haughey |
| 2013/0103634 A1 | 4/2013 | Jojic et al. |
| 2013/0124259 A1 | 5/2013 | Chourey et al. |
| 2013/0159319 A1 | 6/2013 | Duan et al. |
| 2013/0179264 A1 | 7/2013 | Wilson |
| 2013/0185147 A1 | 7/2013 | Predescu et al. |
| 2013/0197675 A1 | 8/2013 | McCarthy et al. |
| 2013/0246176 A1 | 9/2013 | Chang et al. |
| 2013/0262171 A1 | 10/2013 | Solodko et al. |
| 2013/0282509 A1 | 10/2013 | Strong et al. |
| 2013/0290172 A1 | 10/2013 | Mashinsky |
| 2013/0311271 A1 | 11/2013 | Agrawal et al. |
| 2013/0346157 A1 | 12/2013 | Konstantinidis et al. |
| 2013/0346981 A1 | 12/2013 | Johnson et al. |
| 2014/0019249 A1 | 1/2014 | Carlswell et al. |
| 2014/0025467 A1 | 1/2014 | Nagarajan et al. |
| 2014/0032261 A1 | 1/2014 | Kotak |
| 2014/0143100 A1 | 5/2014 | Glustrom et al. |
| 2014/0207533 A1 | 7/2014 | Gregg |
| 2014/0279058 A1 | 9/2014 | Mullins et al. |
| 2015/0088610 A1 | 3/2015 | Bayles et al. |
| 2015/0142516 A1 | 5/2015 | Schwans et al. |
| 2015/0149091 A1 | 5/2015 | Milton et al. |
| 2016/0212266 A1 | 7/2016 | Soundar |
| 2016/0314399 A1 | 10/2016 | Mullins et al. |

OTHER PUBLICATIONS

U.S. Appl. No. 13/803,445, filed Mar. 14,2013; In re: Shariff et al., In re: Method, Apparatus, and Computer Program Product for Sales Pipeline Automation.
"Fulfillment source allocation, inventory transshipment, and customer order transfer in e-tailing." Torabi S, Hassini E, Jeihoonian M, Transp Res Part E Logist Transp Rev 79:128-144 (Year: 2015).
Mitigating spillover in online retailing via replenishment, Jason Acimovic, C Stephen, Graves, Manufacturing & Service Operations Management, vol. 19, issue 3, p. 419-436 (Year: 2015).
Wong, W., "Andrew Mason talks about Groupon's growth and growing up", Chicago Tribune, Business, (Sep. 8, 2012), pp. 1-3, Retrieved oniine at: http://articles.chicagotribune.com/2012-09-08/business/chi-andrew-mason-talks-about-groupons-growth-and-growing-up-20120908_1_deal-personalization-groupons-core-daily-deal-business.
U.S. Provisional Application filed on Aug. 13, 2012; entitled "Unified Payment and Return on Investment System", U.S. Appl. No. 61/682,762.
U.S. Provisional Application filed on Apr. 26, 2012; entitled "Deal Meter", U.S. Appl. No. 61/639,067.
U.S. Application filed Sep. 27, 2013, entitled Method, Apparatus, and Computer Program Product for Consumer Tracking, U.S. Appl. No. 14/039,473.
U.S. Application filed on Sep. 26, 2013; entitled "Automated Deal Guide Structure Identification", U.S. Appl. No. 14/038,629.
U.S. Application filed on Mar. 2, 2012; entitled "Relevance Systemfor Consumer Deals", U.S. Appl. No. 13/411,502.
U.S. Application filed on Mar. 15, 2013 entitled "Pull-Type Searching System", U.S. Appl. No. 13/842,379.
U.S. Application filed on Mar. 14, 2013; In re: Richardson et al., entitled "Updating Routing Information Based on Client Location", U.S. Appl. No. 13/829,581.
U.S. Application filed on Dec. 13, 2013, entitled "Method, Apparatus, and Computer Program Product for Providing a Search Feedback System", U.S. Appl. No. 14/106,203.
U.S. Application filed on Apr. 30, 2012, entitled "Sales Enhancement System", U.S. Appl. No. 13/460,745.
International Search Report and Written Opinion for Application No. PCT/US2014/44067 dated Nov. 14, 2014.
International Search Report and Written Opinion for Application No. PCT/US2014/020028 dated Jun. 6, 2014.
Extended European Search Report for European Office Application No. 14818658.8 dated Dec. 9, 2016, 5 pages.
"Support Vector Machine for Regression and Applications to Financial Forecasting" Theodore B. Trafalig and Huseyin Ince 0-7695-0619-4/00 $10.00 2000 IEEE.
"Forecasting Corporate Revenue and Profit: Time-Series Models Versus Management and Analysts" David A. Kodde and Hein Schreuder Journal of Business Finane & Accounting, 11 (3), Autumn 1984, D306686 x $2.50.
"Credit rating analysis with support vector machines and neural networks: a market comparative study" Zan Huanga, Hsinchun Chena, Chia-Jung Hsua, Wun-Hwa Chenb, Soushan Wu 0167-9236/03/$—see front matter 2003 Elsevier B. V. All rights reserved. doi:10.1016/S0167-9236(03)00086-1.
"CMPT 125: Lecture 1: Understanding the Computer" Tamara Smyth School of Computing Science, Simon Fraser University Jan. 3, 2009.
LGadTrack.com WGb Pag (Copyrights) s Lead Track, Feb. 2001, Retrieved from Archive.org Nov. 2007 (Year: 2001).
Marketsoft—eLeads Marketsoft.com, Feb. 2000, Retrieved from Archived.org Jun. 2006 (Year: 2000).
SalesLogix.com Web Pages Sales Logix, Apr. 2001, Retrieved from Archive.org Aug. 2005 (Year: 2001).

* cited by examiner

| | Attribute Name | Description |
|---|---|---|
| 1 | Cat_Beauty_Wellness_Healthcare | If the category of service is Beauty_Wellness_Healthcare, this attribute is 1. Otherwise it is 0. |
| 2 | Cat_Charity | If the category of service is Charity, this attribute is 1. Otherwise it is 0. |
| 3 | Cat_Food_Drink | If the category of service is Food_Drink, this attribute is 1. Otherwise it is 0. |
| 4 | Cat_LeisureOffers_Activities | If the category of service is LeisureOffers_Activities, this attribute is 1. Otherwise it is 0. |
| 5 | Cat_Services | If the category of service is Services, this attribute is 1. Otherwise it is 0. |
| 6 | Cat_Shopping | If the category of service is Shopping, this attribute is 1. Otherwise it is 0. |
| 7 | Cat_Tickets | If the category of service is Tickets, this attribute is 1. Otherwise it is 0. |
| 8 | Cat_Travel | If the category of service is Travel, this attribute is 1. Otherwise it is 0. |
| 9 | Subcat_Accommodation | If the subcategory of service is Accommodation, this attribute is 1. Otherwise it is 0. |
| 10 | Subcat_Alterations_Cobbler | If the subcategory of service is Alterations_Cobbler, this attribute is 1. Otherwise it is 0. |
| 11 | Subcat_AlternativeMedicine | If the subcategory of service is AlternativeMedicine, this attribute is 1. Otherwise it is 0. |
| 12 | Subcat_Bakery_Dessert | If the subcategory of service is Bakery_Dessert, this attribute is 1. Otherwise it is 0. |
| 13 | Subcat_Band | If the subcategory of service is Band, this attribute is 1. Otherwise it is 0. |
| 14 | Subcat_Bar_Club_Hall | If the subcategory of service is Bar_Club_Hall, this attribute is 1. Otherwise it is 0. |
| 15 | Subcat_Big_BoxStore | If the subcategory of service is Big_BoxStore, this attribute is 1. Otherwise it is 0. |
| 16 | Subcat_BoatRental | If the subcategory of service is BoatRental, this attribute is 1. Otherwise it is 0. |
| 17 | Subcat_Caf_CoffeeShop_CyberCaf | If the subcategory of service is Caf_CoffeeShop_CyberCaf, this attribute is 1. Otherwise it is 0. |
| 18 | Subcat_Car_Automotive | If the subcategory of service is Car_Automotive, this attribute is 1. Otherwise it is 0. |
| 19 | Subcat_Charity | If the subcategory of service is Charity, this attribute is 1. Otherwise it is 0. |
| 20 | Subcat_Chiropractic | If the subcategory of service is Chiropractic, this attribute is 1. Otherwise it is 0. |
| 21 | Subcat_Cinema | If the subcategory of service is Cinema, this attribute is 1. Otherwise it is 0. |
| 22 | Subcat_CleaningServices | If the subcategory of service is CleaningServices, this attribute is 1. Otherwise it is 0. |

| 23 | Subcat_Climbing | If the subcategory of service is Climbing, this attribute is 1. Otherwise it is 0. |
|---|---|---|
| 24 | Subcat_CommercialAirline | If the subcategory of service is CommercialAirline, this attribute is 1. Otherwise it is 0. |
| 25 | Subcat_ConsultingServices | If the subcategory of service is ConsultingServices, this attribute is 1. Otherwise it is 0. |
| 26 | Subcat_CosmeticSurgery | If the subcategory of service is CosmeticSurgery, this attribute is 1. Otherwise it is 0. |
| 27 | Subcat_Courses_ContinuingEducation | If the subcategory of service is Courses_ContinuingEducation, this attribute is 1. Otherwise it is 0. |
| 28 | Subcat_Courses_Cooking | If the subcategory of service is Courses_Cooking, this attribute is 1. Otherwise it is 0. |
| 29 | Subcat_Courses_Entertainment | If the subcategory of service is Courses_Entertainment, this attribute is 1. Otherwise it is 0. |
| 30 | Subcat_Courses_EntertainmentMedia_Arts | If the subcategory of service is Courses_EntertainmentMedia_Arts, this attribute is 1. Otherwise it is 0. |
| 31 | Subcat_Courses_SportsTraining | If the subcategory of service is Courses_SportsTraining, this attribute is 1. Otherwise it is 0. |
| 32 | Subcat_CulturalAttractions | If the subcategory of service is CulturalAttractions, this attribute is 1. Otherwise it is 0. |
| 33 | Subcat_DatingServices | If the subcategory of service is DatingServices, this attribute is 1. Otherwise it is 0. |
| 34 | Subcat_DeliveryService | If the subcategory of service is DeliveryService, this attribute is 1. Otherwise it is 0. |
| 35 | Subcat_Distributor | If the subcategory of service is Distributor, this attribute is 1. Otherwise it is 0. |
| 36 | Subcat_Driving | If the subcategory of service is Driving, this attribute is 1. Otherwise it is 0. |
| 37 | Subcat_ElectronicsRepair | If the subcategory of service is ElectronicsRepair, this attribute is 1. Otherwise it is 0. |
| 38 | Subcat_EventRentalServices | If the subcategory of service is EventRentalServices, this attribute is 1. Otherwise it is 0. |
| 39 | Subcat_Flying | If the subcategory of service is Flying, this attribute is 1. Otherwise it is 0. |
| 40 | Subcat_Handyman_Contractors | If the subcategory of service is Handyman_Contractors, this attribute is 1. Otherwise it is 0. |
| 41 | Subcat_Jumping | If the subcategory of service is Jumping, this attribute is 1. Otherwise it is 0. |
| 42 | Subcat_Karting | If the subcategory of service is Karting, this attribute is 1. Otherwise it is 0. |
| 43 | Subcat_Manufacturer | If the subcategory of service is Manufacturer, this attribute is 1. Otherwise it is 0. |
| 44 | Subcat_Mom_Pop_General | If the subcategory of service is Mom_Pop_General, this |

FIG. 6 (Cont.)

| | | attribute is 1. Otherwise it is 0. |
|---|---|---|
| 45 | Subcat_Office_Dental | If the subcategory of service is Office_Dental, this attribute is 1. Otherwise it is 0. |
| 46 | Subcat_Office_Medical | If the subcategory of service is Office_Medical, this attribute is 1. Otherwise it is 0. |
| 47 | Subcat_OtherRental | If the subcategory of service is OtherRental, this attribute is 1. Otherwise it is 0. |
| 48 | Subcat_Parks | If the subcategory of service is Parks, this attribute is 1. Otherwise it is 0. |
| 49 | Subcat_Party | If the subcategory of service is Party, this attribute is 1. Otherwise it is 0. |
| 50 | Subcat_Personal | If the subcategory of service is Personal, this attribute is 1. Otherwise it is 0. |
| 51 | Subcat_Pets | If the subcategory of service is Pets, this attribute is 1. Otherwise it is 0. |
| 52 | Subcat_ProfessionalPhotographyPhotoPrintingFraming | If the subcategory of service is ProfessionalPhotographyPhotoPrintingFraming, this attribute is 1. Otherwise it is 0. |
| 53 | Subcat_Promoter | If the subcategory of service is Promoter, this attribute is 1. Otherwise it is 0. |
| 54 | Subcat_Restaurant | If the subcategory of service is Restaurant, this attribute is 1. Otherwise it is 0. |
| 55 | Subcat_Rides | If the subcategory of service is Rides, this attribute is 1. Otherwise it is 0. |
| 56 | Subcat_Salon_FullService | If the subcategory of service is Salon_FullService, this attribute is 1. Otherwise it is 0. |
| 57 | Subcat_Salon_Hair | If the subcategory of service is Salon_Hair, this attribute is 1. Otherwise it is 0. |
| 58 | Subcat_Salon_HairRemoval | If the subcategory of service is Salon_HairRemoval, this attribute is 1. Otherwise it is 0. |
| 59 | Subcat_Salon_Nail | If the subcategory of service is Salon_Nail, this attribute is 1. Otherwise it is 0. |
| 60 | Subcat_Salon_Skin | If the subcategory of service is Salon_Skin, this attribute is 1. Otherwise it is 0. |
| 61 | Subcat_Salon_Tanning | If the subcategory of service is Salon_Tanning, this attribute is 1. Otherwise it is 0. |
| 62 | Subcat_Shooting | If the subcategory of service is Shooting, this attribute is 1. Otherwise it is 0. |
| 63 | Subcat_Spa_Day | If the subcategory of service is Spa_Day, this attribute is 1. Otherwise it is 0. |
| 64 | Subcat_Spa_Destination | If the subcategory of service is Spa_Destination, this attribute is 1. Otherwise it is 0. |
| 65 | Subcat_Spa_Medical | If the subcategory of service is Spa_Medical, this attribute is 1. Otherwise it is 0. |
| 66 | Subcat_SpecialtyRetail | If the subcategory of service is SpecialtyRetail, this attribute is 1. Otherwise it is 0. |
| 67 | Subcat_SportingRental | If the subcategory of service is SportingRental, this |

FIG. 6 (Cont.)

| | | attribute is 1. Otherwise it is 0. |
|---|---|---|
| 68 | Subcat_Sports_Related | If the subcategory of service is Sports_Related, this attribute is 1. Otherwise it is 0. |
| 69 | Subcat_SportsandOutdoorRepair | If the subcategory of service is SportsandOutdoorRepair, this attribute is 1. Otherwise it is 0. |
| 70 | Subcat_SportsTeam | If the subcategory of service is SportsTeam, this attribute is 1. Otherwise it is 0. |
| 71 | Subcat_Subscriptions | If the subcategory of service is Subscriptions, this attribute is 1. Otherwise it is 0. |
| 72 | Subcat_Tattoo_Piercing | If the subcategory of service is Tattoo_Piercing, this attribute is 1. Otherwise it is 0. |
| 73 | Subcat_Tour | If the subcategory of service is Tour, this attribute is 1. Otherwise it is 0. |
| 74 | Subcat_TourOperator | If the subcategory of service is TourOperator, this attribute is 1. Otherwise it is 0. |
| 75 | Subcat_TourProvider | If the subcategory of service is TourProvider, this attribute is 1. Otherwise it is 0. |
| 76 | Subcat_Transportation | If the subcategory of service is Transportation, this attribute is 1. Otherwise it is 0. |
| 77 | Subcat_TransportationRental | If the subcategory of service is TransportationRental, this attribute is 1. Otherwise it is 0. |
| 78 | Subcat_Venue_Entertainment_Sport | If the subcategory of service is Venue_Entertainment_Sport, this attribute is 1. Otherwise it is 0. |
| 79 | Subcat_Venue_OtherOutdoor | If the subcategory of service is Venue_OtherOutdoor, this attribute is 1. Otherwise it is 0. |
| 80 | Subcat_Venue_PerformingArt | If the subcategory of service is Venue_PerformingArt, this attribute is 1. Otherwise it is 0. |
| 81 | Subcat_VisionCenter | If the subcategory of service is VisionCenter, this attribute is 1. Otherwise it is 0. |
| 82 | Subcat_Watersports | If the subcategory of service is Watersports, this attribute is 1. Otherwise it is 0. |
| 83 | Subcat_Winery_Distillery_Brewery | If the subcategory of service is Winery_Distillery_Brewery, this attribute is 1. Otherwise it is 0. |
| 84 | Subcat_Workout_Fitness | If the subcategory of service is Workout_Fitness, this attribute is 1. Otherwise it is 0. |
| 85 | CompetitorFeatures0 | If the number of competitor features = 0, this attribute is 1. Otherwise it is 0. |
| 86 | CompetitorFeatures1 | If the number of competitor features = 1, this attribute is 1. Otherwise it is 0. |
| 87 | CompetitorFeatures2 | If the number of competitor features = 2, this attribute is 1. Otherwise it is 0. |
| 88 | CompetitorFeatures3 | If the number of competitor features = 3, this attribute is 1. Otherwise it is 0. |
| 89 | CompetitorFeatures4 | If the number of competitor features = 4, this attribute is |

FIG. 6 (Cont.)

| | | 1. Otherwise it is 0. |
|---|---|---|
| 90 | CompetitorFeatures5 | If the number of competitor features >= 5, this attribute is 1. Otherwise it is 0. |
| 91 | yelp_rating | If the merchant exists in Yelp, this attribute is 1. Otherwise it is 0. |
| 92 | yelp_rating0 | If Yelp rating = 0, this attribute is 1. Otherwise it is 0. |
| 93 | yelp_rating1 | If Yelp rating = 1, this attribute is 1. Otherwise it is 0. |
| 94 | yelp_rating1.5 | If Yelp rating = 1.5, this attribute is 1. Otherwise it is 0. |
| 95 | yelp_rating2 | If Yelp rating = 2, this attribute is 1. Otherwise it is 0. |
| 96 | yelp_rating2.5 | If Yelp rating = 2.5, this attribute is 1. Otherwise it is 0. |
| 97 | yelp_rating3 | If Yelp rating = 3, this attribute is 1. Otherwise it is 0. |
| 98 | yelp_rating3.5 | If Yelp rating = 3.5, this attribute is 1. Otherwise it is 0. |
| 99 | yelp_rating4 | If Yelp rating = 4, this attribute is 1. Otherwise it is 0. |
| 100 | yelp_rating4.5 | If Yelp rating = 4.5, this attribute is 1. Otherwise it is 0. |
| 101 | yelp_rating5 | If Yelp rating = 5, this attribute is 1. Otherwise it is 0. |
| 102 | yelp_review_count_0_20 | If 0 < number of Yelp reviews < 20, this attribute is 1. Otherwise it is 0. |
| 103 | yelp_review_count_20_100 | If 20 <= number of Yelp reviews < 100, this attribute is 1. Otherwise it is 0. |
| 104 | yelp_review_count_100andup | If number of Yelp reviews >= 100. Otherwise it is 0. |
| 105 | yelp_price_1 | If Yelp price is $, this attribute is 1. Otherwise it is 0. |
| 106 | yelp_price_2 | If Yelp price is $$, this attribute is 1. Otherwise it is 0. |
| 107 | yelp_price_3 | If Yelp price is $$$, this attribute is 1. Otherwise it is 0. |
| 108 | yelp_price_4 | If Yelp price is $$$$, this attribute is 1. Otherwise it is 0. |
| 109 | trip_rating_null | If the merchant exists in Trip Advisor, this attribute is 1. Otherwise it is 0. |
| 110 | trip_rating0 | If Trip Advisor rating = 0, this attribute is 1. Otherwise it is 0. |
| 111 | trip_rating1 | If Trip Advisor rating = 1, this attribute is 1. Otherwise it is 0. |
| 112 | trip_rating1.5 | If Trip Advisor rating = 1.5, this attribute is 1. Otherwise it is 0. |
| 113 | trip_rating2 | If Trip Advisor rating = 2, this attribute is 1. Otherwise it is 0. |
| 114 | trip_rating2.5 | If Trip Advisor rating = 2.5, this attribute is 1. Otherwise it is 0. |
| 115 | trip_rating3 | If Trip Advisor rating = 3, this attribute is 1. Otherwise it is 0. |
| 116 | trip_rating3.5 | If Trip Advisor rating = 3.5, this attribute is 1. Otherwise it is 0. |
| 117 | trip_rating4 | If Trip Advisor rating = 4, this attribute is 1. Otherwise it is 0. |
| 118 | trip_rating4.5 | If Trip Advisor rating = 4.5, this attribute is 1. Otherwise it is 0. |
| 119 | trip_rating5 | If Trip Advisor rating = 5, this attribute is 1. Otherwise |

FIG. 6 (Cont.)

| | | |
|---|---|---|
| | | it sudois 0. |
| 120 | trip_advisor_review_count_0_10 | If 0 < number of Trip Advisor reviews < 10, this attribute is 1. Otherwise it is 0. |
| 121 | trip_advisor_review_count_10andup | If number of Trip Advisor reviews >= 10, this attribute is 1. Otherwise it is 0. |
| 122 | city_rating_null | If the merchant exists in City Search, this attribute is 1. Otherwise it is 0. |
| 123 | city_rating0 | If City Search rating = 0, this attribute is 1. Otherwise it is 0. |
| 124 | city_rating1 | If City Search rating = 1, this attribute is 1. Otherwise it is 0. |
| 125 | city_rating1.5 | If City Search rating = 1.5, this attribute is 1. Otherwise it is 0. |
| 126 | city_rating2 | If City Search rating = 2, this attribute is 1. Otherwise it is 0. |
| 127 | city_rating2.5 | If City Search rating = 2.5, this attribute is 1. Otherwise it is 0. |
| 128 | city_rating3 | If City Search rating = 3, this attribute is 1. Otherwise it is 0. |
| 129 | city_rating3.5 | If City Search rating = 3.5, this attribute is 1. Otherwise it is 0. |
| 130 | city_rating4 | If City Search rating = 4, this attribute is 1. Otherwise it is 0. |
| 131 | city_rating4.5 | If City Search rating = 4.5, this attribute is 1. Otherwise it is 0. |
| 132 | city_rating5 | If City Search rating = 5, this attribute is 1. Otherwise it is 0. |
| 133 | city_search_review_count_0_10 | If 0 < number of City Search reviews < 10, this attribute is 1. Otherwise it is 0. |
| 134 | city_search_review_count_10andup | If number of City Search reviews >= 10, this attribute is 1. Otherwise it is 0. |
| 135 | yahoo_rating_null | If the merchant exists in Yahoo Local, this attribute is 1. Otherwise it is 0. |
| 136 | yahoo_rating0 | If Yahoo Local rating = 0, this attribute is 1. Otherwise it is 0. |
| 137 | yahoo_rating1 | If Yahoo Local rating = 1, this attribute is 1. Otherwise it is 0. |
| 138 | yahoo_rating1.5 | If Yahoo Local rating = 1.5, this attribute is 1. Otherwise it is 0. |
| 139 | yahoo_rating2 | If Yahoo Local rating = 2, this attribute is 1. Otherwise it is 0. |
| 140 | yahoo_rating2.5 | If Yahoo Local rating = 2.5, this attribute is 1. Otherwise it is 0. |
| 141 | yahoo_rating3 | If Yahoo Local rating = 3, this attribute is 1. Otherwise it is 0. |
| 142 | yahoo_rating3.5 | If Yahoo Local rating = 3.5, this attribute is 1. Otherwise it is 0. |

600
FIG. 6 (Cont.)

| 143 | yahoo_rating4 | If Yahoo Local rating = 4, this attribute is 1. Otherwise it is 0. |
|---|---|---|
| 144 | yahoo_rating4.5 | If Yahoo Local rating = 4.5, this attribute is 1. Otherwise it is 0. |
| 145 | yahoo_rating5 | If Yahoo Local rating = 5, this attribute is 1. Otherwise it is 0. |
| 146 | yahoo_local_review_count_0_10 | If 0 < number of Yahoo Local reviews < 10, this attribute is 1. Otherwise it is 0. |
| 147 | yahoo_local_review_count_10andup | If number of Yahoo Local reviews >= 10, this attribute is 1. Otherwise it is 0. |
| 148 | urban_spoon_rating | If the merchant exists in Urban Spoon, this attribute is 1. Otherwise it is 0. |
| 149 | urban_rating_0_10 | If 0 < Urban Spoon rating < 10, this attribute is 1. Otherwise it is 0. |
| 150 | urban_rating_10_50 | If 10 <= Urban Spoon rating < 50, this attribute is 1. Otherwise it is 0. |
| 151 | urban_rating50andup | If Urban Spoon rating >= 50, this attribute is 1. Otherwise it is 0. |
| 152 | urban_spoon_review_count_0_10 | If 0 < number of Urban Spoon reviews < 10, this attribute is 1. Otherwise it is 0. |
| 153 | urban_spoon_review_count_10andup | If number of Urban Spoon reviews >= 10, this attribute is 1. Otherwise it is 0. |
| 154 | insider_rating_null | If the merchant exists in Insider Page, this attribute is 1. Otherwise it is 0. |
| 155 | insider_rating0 | If Insider Page rating = 0, this attribute is 1. Otherwise it is 0. |
| 156 | insider_rating1 | If Insider Page rating = 1, this attribute is 1. Otherwise it is 0. |
| 157 | insider_rating1.5 | If Insider Page rating = 1.5, this attribute is 1. Otherwise it is 0. |
| 158 | insider_rating2 | If Insider Page rating = 2, this attribute is 1. Otherwise it is 0. |
| 159 | insider_rating2.5 | If Insider Page rating = 2.5, this attribute is 1. Otherwise it is 0. |
| 160 | insider_rating3 | If Insider Page rating = 3, this attribute is 1. Otherwise it is 0. |
| 161 | insider_rating3.5 | If Insider Page rating = 3.5, this attribute is 1. Otherwise it is 0. |
| 162 | insider_rating4 | If Insider Page rating = 4, this attribute is 1. Otherwise it is 0. |
| 163 | insider_rating4.5 | If Insider Page rating = 4.5, this attribute is 1. Otherwise it is 0. |
| 164 | insider_rating5 | If Insider Page rating = 5, this attribute is 1. Otherwise it is 0. |
| 165 | insider_pages_review_count_0_10 | If 0 < number of Insider Page reviews < 10, this attribute is 1. Otherwise it is 0. |
| 166 | insider_pages_review_count_10andup | If number of Insider Page reviews >= 10, this attribute |

FIG. 6 (Cont.)

| | | |
|---|---|---|
| | | is 1. Otherwise it is 0. |
| 167 | expedia_rating | If the merchant exists in Expedia, this attribute is 1. Otherwise it is 0. |
| 168 | expedia_rating_0 | If Expedia rating = 0, this attribute is 1. Otherwise it is 0. |
| 169 | expedia_rating_1 | If Expedia rating = 1, this attribute is 1. Otherwise it is 0. |
| 170 | expedia_rating_1.5 | If Expedia rating = 1.5, this attribute is 1. Otherwise it is 0. |
| 171 | expedia_rating_2 | If Expedia rating = 2, this attribute is 1. Otherwise it is 0. |
| 172 | expedia_rating_2.5 | If Expedia rating = 2.5, this attribute is 1. Otherwise it is 0. |
| 173 | expedia_rating_3 | If Expedia rating = 3, this attribute is 1. Otherwise it is 0. |
| 174 | expedia_rating_3.5 | If Expedia rating = 3.5, this attribute is 1. Otherwise it is 0. |
| 175 | expedia_rating_4 | If Expedia rating = 4, this attribute is 1. Otherwise it is 0. |
| 176 | expedia_rating_4.5 | If Expedia rating = 4.5, this attribute is 1. Otherwise it is 0. |
| 177 | expedia_rating_5 | If Expedia rating = 5, this attribute is 1. Otherwise it is 0. |
| 178 | expedia_review_count_0_10 | If 0 < number of Expedia reviews < 10, this attribute is 1. Otherwise it is 0. |
| 179 | expedia_review_count_10andup | If number of Expedia reviews >= 10, this attribute is 1. Otherwise it is 0. |
| 180 | google_places_rating | If the merchant exists in Google Place, this attribute is 1. Otherwise it is 0. |
| 181 | google_places_rating_0 | If Google Place rating = 0, this attribute is 1. Otherwise it is 0. |
| 182 | google_places_rating_1 | If Google Place rating = 1, this attribute is 1. Otherwise it is 0. |
| 183 | google_places_rating_1.5 | If Google Place rating = 1.5, this attribute is 1. Otherwise it is 0. |
| 184 | google_places_rating_2 | If Google Place rating = 2, this attribute is 1. Otherwise it is 0. |
| 185 | google_places_rating_2.5 | If Google Place rating = 2.5, this attribute is 1. Otherwise it is 0. |
| 186 | google_places_rating_3 | If Google Place rating = 3, this attribute is 1. Otherwise it is 0. |
| 187 | google_places_rating_3.5 | If Google Place rating = 3.5, this attribute is 1. Otherwise it is 0. |
| 188 | google_places_rating_4 | If Google Place rating = 4, this attribute is 1. Otherwise it is 0. |
| 189 | google_places_rating_4.5 | If Google Place rating = 4.5, this attribute is 1. Otherwise it is 0. |

600
FIG. 6 (Cont.)

| 190 | google_places_rating_5 | If Google Place rating = 5, this attribute is 1. Otherwise it is 0. |
| 191 | google_places_review_count_0_10 | If 0 < number of Google Place reviews < 10, this attribute is 1. Otherwise it is 0. |
| 192 | google_places_review_count_10andup | If number of Google Place reviews >= 10, this attribute is 1. Otherwise it is 0. |
| 193 | facebook_likes_0_50 | If 0 < number of Google Place reviews < 50, this attribute is 1. Otherwise it is 0. |
| 194 | facebook_likes_50_100 | If 50 <= number of Google Place reviews < 100, this attribute is 1. Otherwise it is 0. |
| 195 | facebook_likes_100andup | If number of Google Place reviews >= 100, this attribute is 1. Otherwise it is 0. |

600
FIG. 6 (Cont.)

METHOD, APPARATUS, AND COMPUTER PROGRAM PRODUCT FOR DETERMINING CLOSING METRICS

CROSS REFERENCES TO RELATED APPLICATIONS

This application is a continuation of and claims priority to U.S. application Ser. No. 15/051,165, filed Feb. 23, 2016, titled "METHOD, APPARATUS, AND COMPUTER PROGRAM PRODUCT FOR DETERMINING A PROVIDER RETURN RATE," which claims priority to U.S. application Ser. No. 13/826,757, filed Mar. 14, 2013, "METHOD, APPARATUS, AND COMPUTER PROGRAM PRODUCT FOR DETERMINING A PROVIDER RETURN RATE," which claim priority to U.S. Provisional Patent Application No. 61/730,046, titled "METHOD AND APPARATUS FOR MATCHING SUBSCRIBER DEMAND WITH MERCHANT/INVENTORY SUPPLY" filed on Nov. 26, 2012, and U.S. Provisional Application No. 61/709,623, titled "MERCHANT SIDE CROSS-CATEGORY DEAL DIVERSITY," filed Oct. 4, 2012, each of which is hereby incorporated by reference.

The present application is related to U.S. patent application Ser. No. 13/803,445, filed Mar. 14, 2013, titled "METHOD, APPARATUS, AND COMPUTER PROGRAM PRODUCT FOR SALES PIPELINE AUTOMATION", U.S. patent application Ser. No. 13/826,333, filed Mar. 14, 2013, titled "METHOD, APPARATUS, AND COMPUTER PROGRAM PRODUCT FOR DEMAND FORECASTING", U.S. patent application Ser. No. 13/805,000, filed Mar. 14, 2013, titled "METHOD, APPARATUS, AND COMPUTER PROGRAM PRODUCT FOR IDENTIFICATION OF SUPPLY SOURCES", U.S. patent application Ser. No. 13/826,464, filed Mar. 14, 2013, titled "METHOD, APPARATUS, AND COMPUTER PROGRAM PRODUCT FOR LEAD ASSIGNMENT", U.S. patent application Ser. No. 13/826,866, filed Mar. 14, 2013, titled "METHOD, APPARATUS, AND COMPUTER PROGRAM PRODUCT FOR CALCULATING A PROVIDER QUALITY SCORE", U.S. patent application Ser. No. 13/804,403, filed Mar. 14, 2013, titled "METHOD, APPARATUS, AND COMPUTER PROGRAM PRODUCT FOR IDENTIFYING A SERVICE NEED VIA A PROMOTIONAL SYSTEM", U.S. patent application Ser. No. 13/804,316, filed Mar. 14, 2013, titled "METHOD, APPARATUS, AND COMPUTER PROGRAM PRODUCT FOR DETERMINING CLOSING METRICS", and U.S. patent application Ser. No. 13/830,243, filed Mar. 14, 2013, titled "CAPACITY CALCULATOR", and U.S. patent application Ser. No. 13/804,403, filed Mar. 14, 2013, titled "MERCHANT SIDE CROSS-CATEGORY DEAL DIVERSITY" each of which is hereby incorporated by reference.

BACKGROUND

The internet has transformed ways in which people communicate. A promotional and marketing service may utilize the internet to provide consumers with available promotions related to products, services or experiences offered by providers that may be of interest. However, determining which providers to engage poses a risk. A promotion and marketing service may spend limited resources finding, engaging, maintaining and paying a provider. Some providers end up being a bad investment, because consumers may request refunds on the purchases of promotions related to certain providers. Research shows an extremely small percentage of providers cause a disproportionately large amount of refunds. For example, analysis shows that 7% of existing providers cause over 40% of refunds. Other research shows that 0.2% of providers cause 20% of refunds.

Applicant has discovered problems with current methods of using available information to determine with which providers of goods, service, and/or experiences, they should engage in a business relationship. Through applied effort, ingenuity, and innovation, Applicant has solved the identified problems by developing a solution that is embodied by the present invention, which is described in detail below.

BRIEF SUMMARY

In general, embodiments of the present invention provided herein include systems, methods and computer readable media for calculating a provider quality score.

In one embodiment, a method for classifying providers based on a return rate of a provider is provided, the method may comprise supplying a classifying model with a dataset, wherein the dataset comprises an identification of a provider and a plurality of attributes corresponding to the provider, and identifying a class of the provider in accordance with the plurality of corresponding attributes, wherein the identification is determined based on one or more patterns determinative of a return rate by the classifying model.

In another embodiment, the classifying model is a support vector machine. In another embodiment, the method may further comprise determining which one of a plurality of classifying models to utilize based on available attribute data. In another embodiment, the corresponding attributes are assembled from one or more of (1) internal data, (2) external data, and (3) web data. In another embodiment, the method may further comprise generating the plurality of attributes by normalizing a plurality of raw data. In another embodiment, the corresponding attributes comprises one or more of category data, sub-category data, and competitor feature data. In another embodiment, the corresponding attributes may comprise one or more of time data, financial stability risk data, median credit data, count of judgment data, and risk level data. In another embodiment, the corresponding attributes comprise web data.

In another embodiment a method for training a classifying model is provided, the method may comprise supplying a classifying model with a dataset, wherein the dataset comprises an identification of one or more providers, a plurality of attributes corresponding to the one or more providers and a historical return rate that corresponds to a promotion provided by the one or more providers and training the classifying model to recognize one or more patterns indicative of a return rate of a provider in accordance the plurality of corresponding attributes, wherein the corresponding attributes are assembled from one or more sources.

In another embodiment, the method may further comprise identifying a subset of the plurality of corresponding attributes determinative of an improved classification and training the classifying model in accordance the subset of the plurality of corresponding attributes. In another embodiment, the corresponding attributes may comprise one or more of category data, sub-category data, and competitor feature data. In another embodiment, the corresponding attributes comprises one or more of time data, financial stability risk data, median credit data, count of judgment data, and risk level data. In another embodiment, the corresponding attributes comprise web data. In another embodiment, the classifying model is a support vector machine. In another embodiment, the corresponding attributes are assembled from one or more of (1) internal data, (2) external data, and (3) web data. In another embodiment, the method may further comprise generating the plurality of attributes by normalizing a plurality of raw data.

In another embodiment of the present invention an apparatus is provided. The apparatus may comprise at least one processor and at least one memory including computer program code, the at least one memory and the computer program code configured to, with the at least one processor, cause the apparatus at least to supply a classifying model with a dataset, wherein the dataset comprises an identification of a provider and a plurality of attributes corresponding to the provider and identify a class of the provider in accordance with the plurality of corresponding attributes, wherein the identification is determined based on one or more patterns determinative of a return rate by the classifying model.

In another embodiment, the classifying model is a support vector machine. In another embodiment, the at least one memory and computer program code are configured to, with the at least one processor, cause the apparatus to determine which one of a plurality of classifying models to utilize based on available attribute data. In another embodiment, the corresponding attributes are assembled from one or more of (1) internal data, (2) external data, and (3) web data. In another embodiment, the at least one memory and computer program code are configured to, with the at least one processor, cause the apparatus to generate the plurality of attributes by normalizing a plurality of raw data. In another embodiment, the corresponding attributes comprises one or more of category data, sub-category data, and competitor feature data. In another embodiment, the corresponding attributes may comprise one or more of time data, financial stability risk data, median credit data, count of judgment data, and risk level data. In another embodiment, the corresponding attributes may comprise web data.

In another embodiment of the present invention, an apparatus is provided, the apparatus comprising at least one processor and at least one memory including computer program code, the at least one memory and the computer program code configured to, with the at least one processor, cause the apparatus at least to supply a classifying model with a dataset, wherein the dataset comprises an identification of one or more providers, a plurality of attributes corresponding to the one or more providers and a historical return rate that corresponds to a promotion provided by the one or more providers, and train the classifying model to recognize one or more patterns indicative of a return rate of a provider in accordance the plurality of corresponding attributes, wherein the corresponding attributes are assembled from one or more sources.

In another embodiment, the at least one memory and computer program code are configured to, with the at least one processor, cause the apparatus to identify a subset of the plurality of corresponding attributes determinative of an improved classification and training the classifying model in accordance the subset of the plurality of corresponding attributes.

In another embodiment, the corresponding attributes comprises one or more of category data, sub-category data, and competitor feature data. In another embodiment, the corresponding attributes comprises one or more of time data, financial stability risk data, median credit data, count of judgment data, and risk level data. In another embodiment, the corresponding attributes may comprise web data. In another embodiment, the classifying model is a support vector machine. In another embodiment, the corresponding attributes are assembled from one or more of (1) internal data, (2) external data, and (3) web data. In another embodiment, the at least one memory and computer program code are configured to, with the at least one processor, cause the apparatus to generate the plurality of attributes by normalizing a plurality of raw data.

In another embodiment of the present invention, a computer program product is provided. The computer program product may comprise at least one computer-readable storage medium having computer-executable program code instructions stored therein, the computer-executable program code instructions comprising program code instructions for supplying a classifying model with a dataset, wherein the dataset comprises an identification of a provider and a plurality of attributes corresponding to the provider and identifying a class of the provider in accordance with the plurality of corresponding attributes, wherein the identification is determined based on one or more patterns determinative of a return rate by the classifying model.

In another embodiment, the classifying model is a support vector machine. In another embodiment, the computer-executable program code portions further comprise program code instructions for determining which one of a plurality of classifying models to utilize based on available attribute data. In another embodiment, the corresponding attributes are assembled from one or more of (1) internal data, (2) external data, and (3) web data. In another embodiment, the computer-executable program code portions further comprise program code instructions for generating the plurality of attributes by normalizing a plurality of raw data. In another embodiment, the corresponding attributes comprises one or more of category data, sub-category data, and competitor feature data. In another embodiment, the corresponding attributes comprises one or more of time data, financial stability risk data, median credit data, count of judgment data, and risk level data. In another embodiment, the corresponding attributes comprise web data.

In another embodiment of the present invention a computer program product is provided, the computer program product comprising at least one computer-readable storage medium having computer-executable program code instructions stored therein, the computer-executable program code instructions comprising program code instructions for supplying a classifying model with a dataset, wherein the dataset comprises an identification of one or more providers, a plurality of attributes corresponding to the one or more providers and a historical return rate that corresponds to a promotion provided by the one or more providers and training the classifying model to recognize one or more patterns indicative of a return rate of a provider in accordance the plurality of corresponding attributes, wherein the corresponding attributes are assembled from one or more sources.

In another embodiment, the computer-executable program code portions further comprise program code instructions for identifying a subset of the plurality of corresponding attributes determinative of an improved classification and training the classifying model in accordance the subset of the plurality of corresponding attributes. In another embodiment, the corresponding attributes comprises one or more of category data, sub-category data, and competitor feature data. In another embodiment, the corresponding attributes comprises one or more of time data, financial stability risk data, median credit data, count of judgment data, and risk level data. In another embodiment, the corresponding attributes comprise web data. In another embodiment, the classifying model is a support vector machine. In another embodiment, the corresponding attributes are assembled from one or more of (1) internal data, (2) external data, and (3) web data. In another embodiment, the computer-executable program code portions further comprise program code instructions for generating the plurality of attributes by normalizing a plurality of raw data.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 6 shows a flowchart showing an exemplary process for generating attribute data by normalizing raw data, in accordance with some embodiments discussed herein;

DETAILED DESCRIPTION

Figure 1:
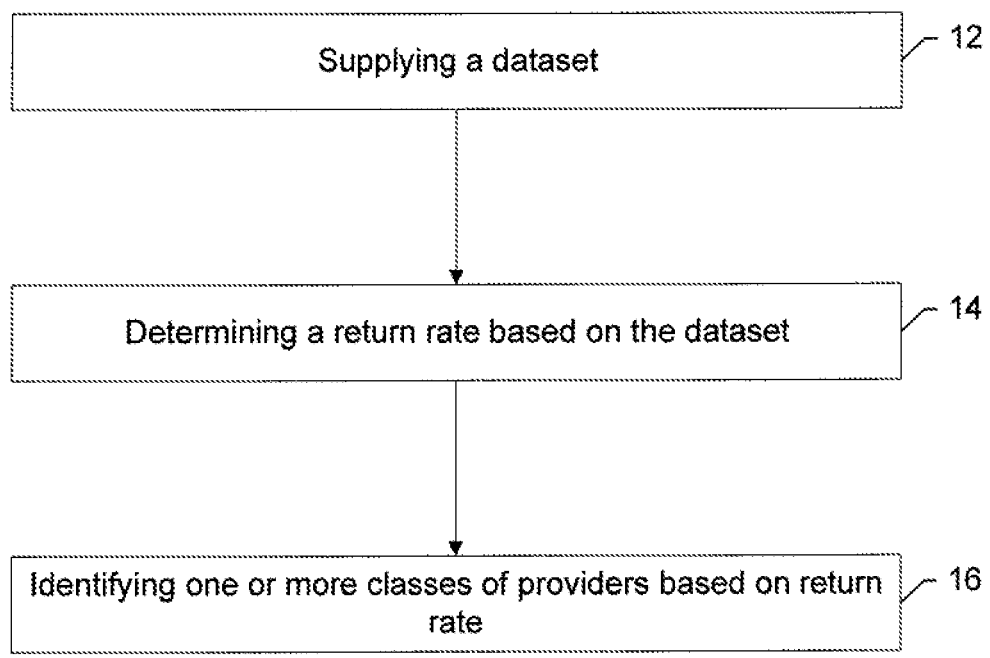
FIG. 1 is a flowchart showing an exemplary process for determining a provider return rate.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

The methods, apparatus and computer program products described herein are operable to determine a provider return rate and/or whether a provider is likely to have a high return rate. A return may be the act of requesting a refund of the purchase price of a promotion that a consumer bought in the past. The return rate of a provider may be the percentage of promotions related to the provider that are returned. In one example, a provider return rate algorithm may classify a provider into one of two categories. In one category, a provider may be labeled a "bad provider" due to having attributes associated or correlated with previous providers having a high return rate.

Because analysis shows that a percentage of providers cause a disproportionately large amount of refunds, a promotion and marketing service access, capture and/or store data related to providers with known return rates and utilize that information to determine likely return rates of other providers.

In one example, a promotion and marketing system may supply a data set to a learning machine or algorithm. The learning machine or algorithm may then determine which features or attributes of a provider correlate to a high return rate and which features correlate to a low return rate. Once the learning machine or algorithm is trained, live data associated with a new provider may be input and the learning machine or algorithm may then classify the provider as likely to have a high return rate or not likely to have a high return rate. As such, the promotion and marketing system may determine how to proceed with a particular provider on a particular promotion. Alternatively or additionally, in some example embodiments, the learning machine or algorithm may output a score or rate for each provider to enable the promotion and marketing system to make a choice between providers.

Definitions

A promotion and marketing service may include a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A provider may include, but is not limited to, a merchant, business owner, consigner, shopkeeper, tradesperson, vender, operator, entrepreneur, agent, dealer, organization, supply source or the like that is in the business of a providing a good, service or experience to a consumer, facilitating the provision of a good, service or experience to a consumer and/or otherwise operating in the stream of commerce. For example, a provider may form a running company that sells attire that is generally used by a person who runs or participates in athletic activities.

A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

Consumers may include, but are not limited to, a client, customer, purchaser, shopper, user or the like who may be in the position to or does exchange value for one or more instruments under the terms defined by the one or more promotions. For example, and using the aforementioned running company as the example provider, an individual who is interested in purchasing running shoes.

An instrument may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

Support vector machines (SVMs) are supervised learning models with associated learning algorithms that analyze data and recognize patterns, used for classification and regression analysis. Classifying data is a task often associated with machine learning. SVMs are one type of machine learning. The basic SVM may take a set of input data and predict, for each given input, which of two possible classes forms the output. Given a set of training examples, each marked as belonging to one of two categories, a SVM training algorithm builds a classifying model that assigns new examples into one category or the other. A SVM may represent the examples as points in space, mapped so that the examples of the separate categories are divided by a clear gap that is as wide as possible. New examples may then be mapped into that same space and predicted to belong to a category based on which side of the gap they fall on.

Process Overview

By way of example, FIG. 1 is a block a diagram that illustrates an exemplary process for determining a provider return rate. In general, the process may access and/or capture internal, external and web data related to a provider. The process may then supply one or more of the internal, external or web data to a learning algorithm. The learning algorithm may be trained to calculate and/or determine a provider return rate based on the supplied data. In some example embodiments the learning algorithm may classify the provider based on a predicted return rate.

As shown in block 12 of FIG. 1, an apparatus, such as the apparatus 30 or promotional system 710, may be configured to cause a promotion and marketing system to supply a data set to a provider return rate algorithm. The dataset may include one or more of internal data, external data, and captured web data. Internal data may comprise category information, sub-category information, location information, price information, information related to a number of promotions a provider has offered via the promotion and marketing system or a competitor system, provider attributes (e.g., time in business, market cap, number of employees, owner information, branding, etc.). Internal data may also include an actual return rate for a particular provider with respect to their previously offered promotions. External data may include credit report data, such as time in file data, financial stability risk data, median credit data, count of judgment data and risk level data. Captured web data may include data such as review ratings and numbers of reviews from a plurality of internet sites (e.g., Yelp®, Google®, Yelp®, Yahoo®, City Search®, Trip Advisor®, etc.), likes (e.g., Facebook® likes), and the like. Other factors may be included based on the factors ability to provide an indication of a provider return rate.

In some example embodiments, the provider return rate algorithm may be determined based on the availability of specific data in the data set. As such, there may be one or more available provider return rate algorithms. For example, in an instance in which credit report data is not available for a provider a first provider return rate algorithm may be used, whereas a second provider return rate algorithm may be used in an instance in which credit report data is available.

As shown in block 14 of FIG. 1, an apparatus, such as the apparatus 30 or promotional system 710, may be configured to determine a return rate of a provider. In some example embodiments, the apparatus 30 is configured to be trained to calculate or determine a return rate based on a training and testing method that may comprise inputting one or more subsets of training data, generating one or more algorithms for determining return rate, testing the algorithms, selecting an algorithm based on one or more predetermined factors (e.g., accuracy, etc.) and/or the like.

As shown in block 16 of FIG. 1, an apparatus, such as the apparatus 30 or promotional system 710, may be configured to identify a class for the provider based on a determined return rate of the provider. In another embodiment, the identification may be made based on whether the provider is determined likely to have a return rate over or under a predetermined threshold (e.g., 10%).

For example, a provider may have associated data such as category indicated a "food and drink" category, sub-category data indicating "coffee shop", competitor data indicating the provider has one previous competitor offer, no credit report data, and various review data. The apparatus, such as an apparatus comprising a Support Vector Machine (SVM) or other supervised learning model may receive that data and determine whether the provider likely to have a return rate above a predetermined threshold based on learning and testing process in which its already been through.

System and Apparatus

Figure 2:
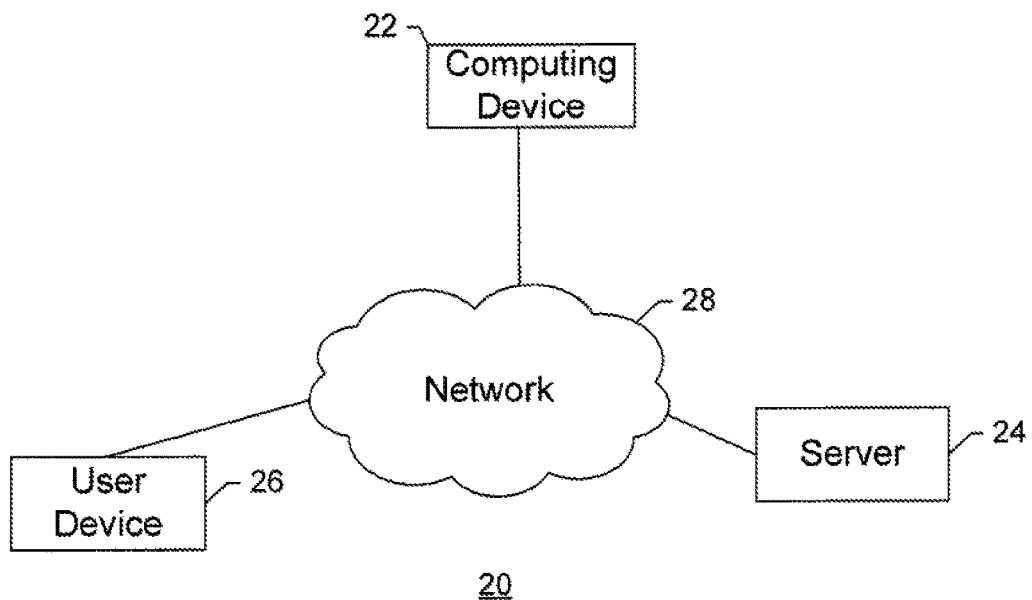
FIG. 2 is block diagram of a system that may be specifically configured in accordance with an example embodiment of the present invention.

Referring now of FIG. 2, a system that supports communication, either wirelessly or via a wireline, between a computing device 22 and a server 24 or other network entity (hereinafter generically referenced as a "server") is illustrated. As shown, the computing device and the server may be in communication via a network 28, such as a wide area network, such as a cellular network or the Internet or a local area network. However, the computing device and the server may be in communication in other manners, such as via direct communications between the computing device and the server.

The computing device 22 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 24 may also be embodied by a computing device and, in one embodiment, is embodied by a web server. Additionally, while the system of FIG. 2 depicts a single server, the server may be comprised of a plurality of servers which may collaborate to support browsing activity conducted by the computing device.

Figure 3:
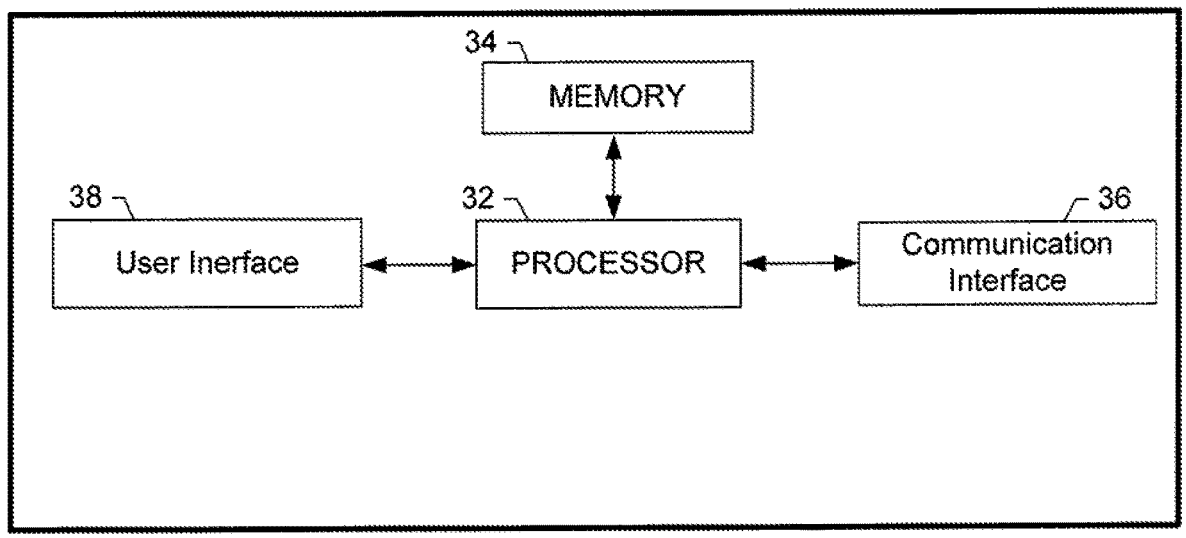
FIG. 3 is a block diagram of an apparatus that may be specifically configured in accordance with an example embodiment of the present invention.

Regardless of the type of device that embodies the computing device 22, the computing device may include or be associated with an apparatus 30 as shown in FIG. 3. In this regard, the apparatus may include or otherwise be in communication with a processor 32, a memory device 34, a communication interface 36 and a user interface 38. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 32 (and/or co-processors or any other processing circuitry assisting or otherwise associated with the processor) may be in communication with the memory device 34 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 30 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 30 may be embodied by a computing device 22 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an application specific integrated circuit (ASIC), a field programmable gate array (FPGA), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 38.

Meanwhile, the communication interface 36 may be any means such as a device or circuitry embodied in either hardware or a combination of hardware and software that is configured to receive and/or transmit data between the computing device 22 and a server 24. In this regard, the communication interface 36 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 38 may be in communication with the processor 32, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 34 and/or the communication interface 36, such as via a bus.

Figure 4:
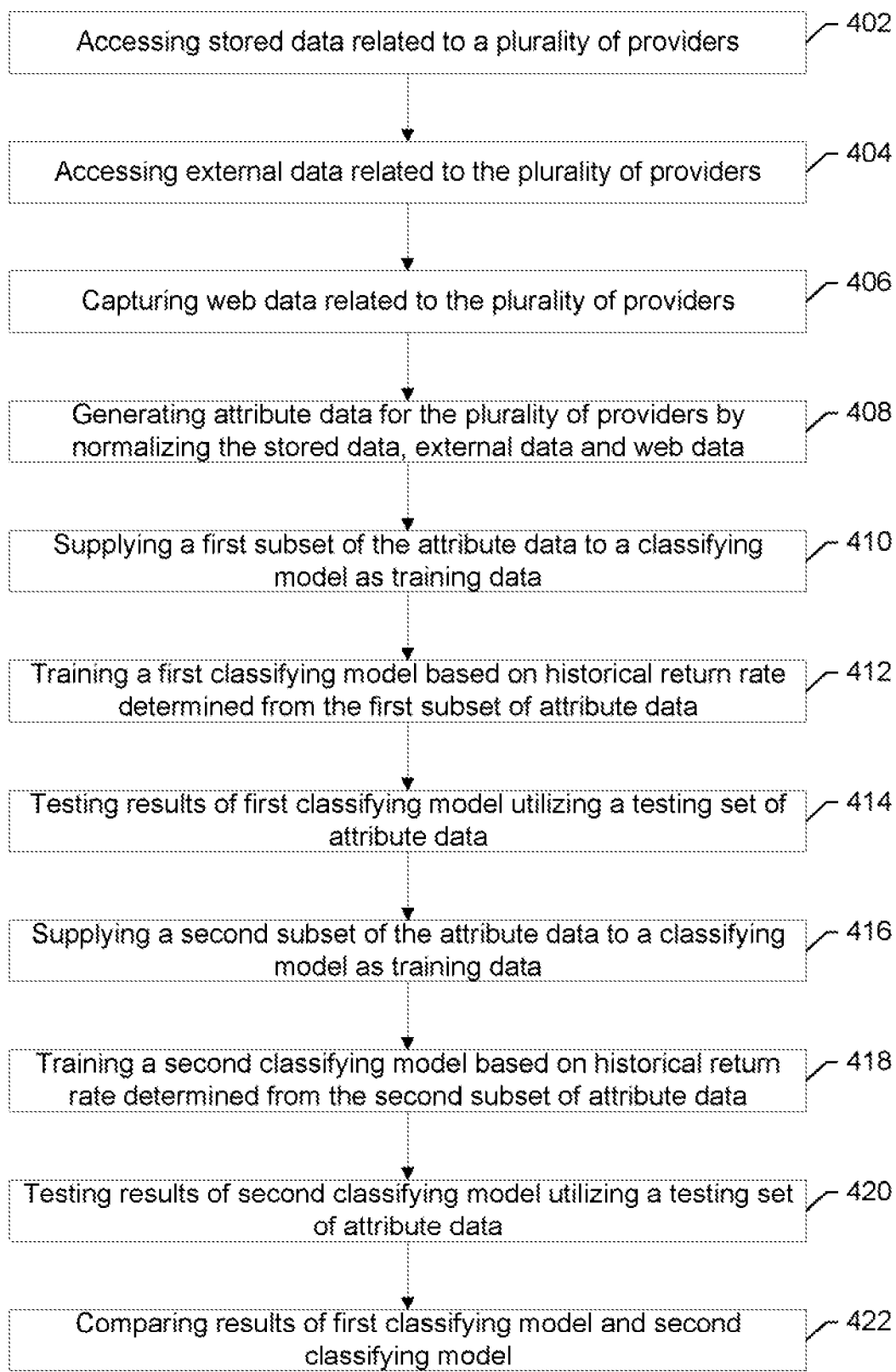
FIG. 4 shows a flow chart showing an exemplary process of training and testing a learning algorithm in accordance with some embodiments discussed herein.
Figure 5:
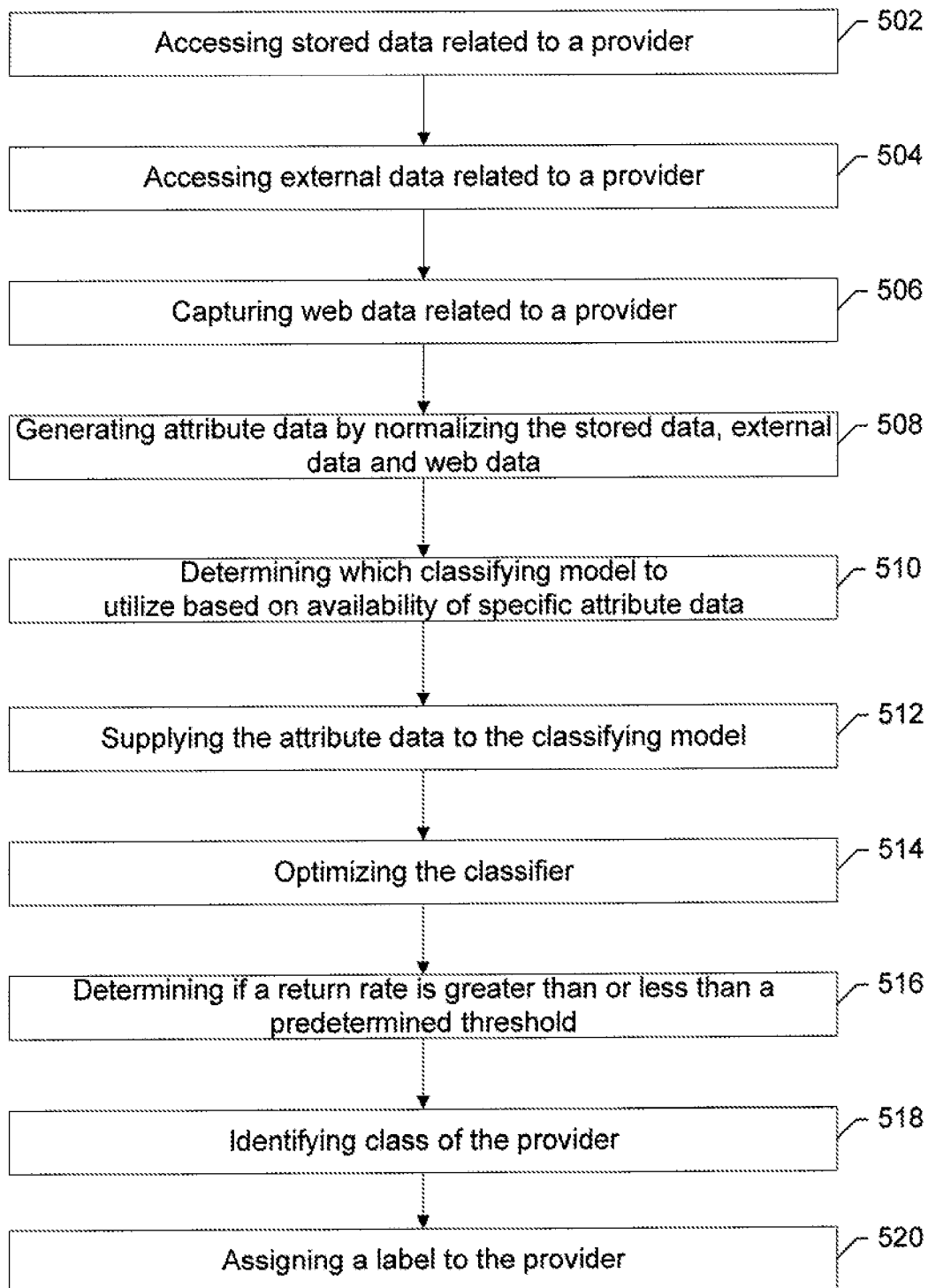
FIG. 5 shows a flowchart showing an exemplary process for determining a provider return rate, in accordance with some embodiments discussed herein.

FIGS. 4 and 5 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 34 of an apparatus employing an embodiment of the present invention and executed by a processor 32 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4 and 5, when executed, convert a computer or processing circuitry into a particular machine configured to perform an example embodiment of the present invention. Accordingly, the operations of FIGS. 4 and 5 define an algorithm for configuring a computer or processing to perform an example embodiment. In some cases, a general purpose computer may be provided with an instance of the processor which performs the algorithms of FIGS. 4 and 5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Training and Testing of Classifying Models

FIG. 4 shows an example method, namely process 400, that may be executed by one or more machines (some examples of which are discussed in connection with FIGS. 2, 3, and/or 7) to train one or more classifying models to recognize one or more patterns that lead to a sub-optimal return rate in order to determine whether a provider is likely to have a return rate above a predetermined threshold, in accordance with some embodiments discussed herein. In some example embodiments, a provider return rate is determined based on actual return rates of providers, whereas in other example embodiments the provider return rate may be based on one or more internal factors, external factors and/or the like.

As shown in block 402 of FIG. 4, an apparatus, such as the apparatus 30 or promotional system 710, may include means, such as processor 32, or the like, for accessing data related to one or more providers. The data may include category data and/or sub-category data related to the products, services or experiences a provider is able to provide in a promotion, location data, hyper-location data, price data, competitor promotion data or the like. For example, "Food and Dining" may be category data and "Bakery and Dessert" may be sub-category data. Competitor promotion data may include data indicating the number of competitor promotions that have been offered by a provider. In one embodiment, the competitor promotion data may also comprise data indicating a time of the promotion(s) offered by a competitor and/or with which competitor the promotion was offered.

As shown in block 404 of FIG. 4, an apparatus, such as the apparatus 30 or promotional system 710, may include means, such as processor 32, or the like, for accessing external data related to one or more providers. In one embodiment, external data may include credit report data (e.g., Experian® data), credit report data (e.g., time in file data), financial stability risk data, median credit data, count of judgment data and risk level data. In another embodiment, external data may include credit report data from any credit bureau or agency. For example, in the United States, Experian®, Equifax®, Transunion® may be used. In other embodiments, different countries may have different data, different access to data and/or different levels of significance of the data.

As shown in block 406 of FIG. 4, an apparatus, such as the apparatus 30 or promotional system 710, may include means, such as processor 32, or the like, for capturing web data related to one or more providers. Web data may include review data and/or a number of reviews of the provider on one or more review type websites (e.g., Yelp®, Google®, Yahoo®, City Search®, Trip Advisor®, etc.) and/or "likes" (e.g., Facebook® likes), and the like. Web data, in some examples, may indicate that a provider has 1,000 reviews on Yelp® with an average review score of 3.5. Web data may also indicate whether a provider has reviews on Yahoo®, Google®, City Search®, and or the like as well as the quantity of reviews on each of those websites.

As shown in block 408 of FIG. 4, an apparatus, such as the apparatus 30 or promotional system 710, may include means, such as processor 32, or the like, for generating attribute data by normalizing one or more of the internal data, external data, and/or web data. In some example embodiments, generating attribute data by normalizing includes assigning a number of reviews, an average review score, and/or a number of "likes" to a particular range that describes the character of the reviews. For examples, "likes" may be placed in buckets such as "0", "1-25", or "25+". Alternatively or additionally, other normalizing may occur, such as determining categories and/or sub-categories for a provider, classifying a credit score and/or the like. Additional details relating to example attributes and methods associated with generating the attribute data are shown with respect to FIG. 6.

As shown in block 410 of FIG. 4, an apparatus, such as the apparatus 30 or promotional system 710, may include means, such as processor 32, or the like, for supplying a first subset of attribute data to a first classifying model as training data. In one embodiment, 25% of the providers and their associated attribute data are supplied to a first classifying model as training data. In one embodiment, the first classifying model utilizes a support vector machine (SVM) modeling technique. Other modeling techniques may also be used in some example embodiments, such as decision tree learning, association rule learning, artificial neural networking, inductive logic programming, clustering, or the like.

As shown in block 412 of FIG. 4, an apparatus, such as the apparatus 30 or promotional system 710, may include means, such as processor 32, or the like, for training the first classifying model based on return rate determined from historical promotions provided via the first subset of attribute data. In one embodiment, the first subset of data includes a historical return rate related to previous promotions and the classifying model is trained to recognize patterns that may lead to particular return rates. In one embodiment, the first classifying model is trained to determine an unknown return rate of a provider. In another embodiment, the first classifying model is trained to determine and/or identify whether a return rate of a provider is likely to be above or below a predetermined threshold (e.g., 10%). Further still, in other example embodiments the classifying model may estimate a risk level for the provider, where the risk level indicates the risk of returns, risk of unsatisfied consumers and/or the like. In one embodiment, the second classifying model may generate or associate a significance number of each attribute.

As shown in block 414 of FIG. 4, an apparatus, such as the apparatus 30 or promotional system 710, may include means, such processor 32, or the like, for testing the results of the first classifying model generated with respect to FIG. 412. In one embodiment, in an instance in which 25% of the provider and associated data are provided as training data, the remaining 75% of the data may be used as testing data.

In one example embodiment, block 412 is configured for training the first classifying model to recognize one or more patterns that lead to a sub-optimal return rate and block 414 is configured for determining the accuracy of the first classifying model using the remaining subset of data.

As shown in block 416 of FIG. 4, an apparatus, such as the apparatus 30 or promotional system 710, may include means, such as processor 32, or the like, for supplying a second subset of attribute data to a second classifying model as training data. In one embodiment, in an instance in which the first subset included 25% of the providers and associated attribute data, the second subset may comprise a different 25% of the providers and associated attribute data. The second classifying model may utilize a support vector machine (SVM) modeling technique. Other modeling techniques may also be used in some example embodiments, such as decision tree learning, association rule learning, artificial neural networking, inductive logic programming, clustering, or the like.

As shown in block 418 of FIG. 4, an apparatus, such as the apparatus 30 or promotional system 710, may include means, such as processor 32, or the like, for training the second classifying model based on return rate determined from historical promotions provided via the second subset of attribute data. In one embodiment, the second subset of data includes a historical return rate related to previous promotions and the second classifying model is trained to recognize patterns that may lead to particular return rates. In one embodiment, the second classifying model is trained to determine an unknown return rate of a provider. In another embodiment, the second classifying model is trained to determine and/or identify whether a return rate of a provider is likely to be above or below a predetermined threshold (e.g., 10%). Further still, in other example embodiments the second classifying model may estimate a risk level for the provider, where the risk level indicates the risk of returns, risk of unsatisfied consumers and/or the like. In one embodiment, the second classifying model may generate or associate a significance number of each attribute.

As shown in block 420 of FIG. 4, an apparatus, such as the apparatus 30 or promotional system 710, may include means, such as processor 32, or the like, for testing the results of the first classifying model. In one embodiment, in an instance in which 25% of the provider and associated data are provided as training data in block 418, the remaining 75% is used as testing data.

In one example embodiment, block 418 is configured for training the second classifying model to recognize one or more patterns that lead to a sub-optimal return rate and block 420 is configured for determining the accuracy of the second classifying model using the remaining subset of data.

As shown in block 422 of FIG. 4, an apparatus, such as the apparatus 30 or promotional system 710, may include means, such as processor 32, or the like, for comparing the results from the first classifying model and the second classifying model. For example, apparatus 20 may be configured to output the results from the first classifying model and the second classifying model to a confusion matrix. The comparison may compare for example, how many "bad" providers (e.g., providers with a return rate above a predetermined threshold) were correctly identified in each classifying model and how many "bad" providers were identified as "good" providers (e.g., providers with a return rate equal to or below a predetermined threshold). The comparison may also compare how many "good" providers were correctly identified and how many "good" providers were identified as "bad".

In one example embodiment, the comparison may yield a more accurate classifying model in block 422 which then may be utilized for execution on live data. Live data may be attribute data related to a provider for which classification as a "bad" provider or "good" provider is sought. For example, a promotion and marketing service may have access to internal data such as category, sub-category and competitor promotion data, external data such as credit report data, and captured web data such as reviews and likes from one or more websites.

Classifying Provider Based on Predicted Return Rate

FIG. 5 shows an example method, namely process 500, that may be executed by one or more machines (some examples of which are discussed in connection with FIGS. 2, 3, and/or 7) to classify a provider as a "bad" provider or "good" provider based on a predicted return rate, in accordance with some example embodiments discussed herein.

As shown in block 502 of FIG. 5, an apparatus, such as the apparatus 30 or promotional system 710, may include means, such as processor 32, or the like, for accessing internal data related to a provider. The data may include category data and/or sub-category data related to the products, services or experiences a provider is able to provide in a promotion, location data, hyper-location data, price data, competitor promotion data or the like. For example, "Food and Dining" may be category data and "Bakery and Dessert" may be sub-category data. Competitor promotion data may include data indicating the number of competitor promotions that have been offered by a provider. In one embodiment, the competitor promotion data may also comprise data indicating a time of the promotion(s) offered by a competitor and/or with which competitor the promotion was offered.

As shown in block 504 of FIG. 5, an apparatus, such as the apparatus 30 or promotional system 710, may include means, such as processor 32, or the like, for accessing external data related to a provider. In one embodiment, external data may include credit report data (e.g., Experian® data), credit report data (e.g., time in file data), financial stability risk data, median credit data, count of judgment data and risk level data. In another embodiment, external data may include credit report data from any credit bureau or agency. For example, in the United States, Experian®, Equifax®, Transunion® may be used. In other embodiments, different countries may have different data, different access to data and/or different levels of significance of the data.

As shown in block 506 of FIG. 5, an apparatus, such as the apparatus 30 or promotional system 710, may include means, such as processor 32, or the like, for capturing web data related to a provider. Web data may include review data and/or a number of reviews of the provider on one or more review type websites (e.g., Yelp®, Google®, Yahoo®, City Search®, Trip Advisor®, etc.) and/or "likes" (e.g., Facebook® likes), and the like. Web data, in some examples, may indicate that a provider has 1,000 reviews on Yelp® with an average review score of 3.5. Web data may also indicate whether a provider has reviews on Yahoo®, Google®, City Search®, and or the like as well as the quantity of reviews on each of those websites.

As shown in block 508 of FIG. 5, an apparatus, such as the apparatus 30 or promotional system 710, may include means, such as processor 32, or the like, for generating attribute data by normalizing the internal data, the external data and/or web data related to a provider. In some example embodiments, generating attribute data by normalizing includes assigning a number of reviews, an average review score, and/or a number of "likes" to a particular range that describes the character of the reviews. For examples, "likes" may be placed in buckets such as "0", "1-25", or "25+". Alternatively or additionally, other normalizing may occur, such as determining categories and/or sub-categories for a provider, classifying a credit score and/or the like. Additional details relating to example attributes and methods associated with generating the attribute data are shown with respect to FIG. 6.

As shown in block 510 of FIG. 5, an apparatus, such as the apparatus 30 or promotional system 710, may include means, such as processor 32, or the like, for determining which of one or more available classifying models to utilize. In one embodiment, different classifying models may be available based on which attribute data is provided. For example, in an instance in which credit report data is not provided, a first classifying model may be utilized. The first classifying model may have been trained with attribute data that did not comprise credit report data. In another embodiment, in an instance in which internal data, external data including credit report data and web data are each provided, a second classifying model may be utilized. The second classifying model may have been trained with attribute data that included internal data, external data including credit report data, and web data.

As shown in block 512 of FIG. 5, an apparatus, such as the apparatus 30 or promotional system 710, may include means, such as processor 32, or the like, for supplying the attribute data to the classifying model determined at block 510.

As shown in block 514 of FIG. 5, an apparatus, such as the apparatus 30 or promotional system 710, may include means, such as processor 32, or the like, for optimizing a classifier. In one embodiment, parameters of a classifier may be optimized by a grid search on the parameter space using cross validation to evaluate the accuracy.

As shown in block 516 of FIG. 5, an apparatus, such as the apparatus 30 or promotional system 710, may include means, such as processor 32, or the like, for determining a return rate. In one embodiment, apparatus 20 may be configured to predict whether a return rate will be greater than, equal to, or less than a predetermined threshold (e.g., 10%).

As shown in block 518 of FIG. 5, an apparatus, such as the apparatus 30 or promotional system 710, may include means, such as processor 32, or the like, for identifying a class of the provider based on the determined likelihood of whether the return rate is greater than, equal to or less than a predetermined threshold. For example, one class of providers may be those providers predicted to have a return rate above the predetermined threshold and may then be referred to as "bad" providers.

As shown in block 520 of FIG. 5, an apparatus, such as the apparatus 30 or promotional system 710, may include means, such as processor 32, or the like, for assigning a label to the provider based on at least one of the determined return rate, the determined likelihood of a return rate exceeding a threshold, and the identified class. For example, a label such as "bad" provider may be assigned to providers that are predicted to have a return rate above a predetermined threshold.

Generating Attributes by Normalizing Raw Data

FIG. 6 shows a list of example attributes and corresponding example methods that may be executed to generate the attributes by normalizing the raw data, in accordance with some embodiments discussed herein. For example, attribute 1 may represent category data, specifically beauty, wellness and healthcare. To determine a normalized value of attribute 1, apparatus 20 may be configured to execute an algorithm on associated raw data related to a provider. Here, for example, if the category data associated with a provider is "beauty, wellness and healthcare", the value of attribute 1 is 1. If the category data associated with a provider is not "beauty, wellness and healthcare", the value of attribute 1 is 0.

As can be seen in FIG. 6, a number of example attributes relate to category data and sub-category data. It should be understood, that attribute data related to location and hyper location data may be generated in a similar fashion. For example, if the location data associated with a provider is "Chicago", the value of attribute n may be 1. If the category data associated with a provider is not "Chicago", the value of attribute 1 may be 0.

It should also be understood that providers may have associated data indicating one or more categories, sub-categories, location, hyper-locations, prices or the like. For example, a provider, such as a gym, may be associated with category data such as "beauty, wellness, and healthcare", "Food and drink", "Leisure Offers and Activities" and/or "Services". A gym may also have more than one location, and may be able to provide promotions in a variety of price ranges and time frames.

FIG. 6 also shows example attribute data associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider. For example, providers from different locations (e.g., different countries, states, neighborhoods or the like) may be associated with different attribute data. For example, different countries have different credit reporting rules and agencies. Thus, a promotion and marketing system may utilize of first combination of attributes for a provider in a first location, hyper-location, category or sub-category and a second combination of attributes for a provider in a second location, hyper-location, category or sub-category.

In one embodiment, other attribute data may be used. For example, attribute "is_in_bad_category" may relate to a identifying providers who offer products, services, and/or experiences in one or more categories categorized as having high return rates based on prior performance data. The feature may be normalized such that if the sub-category of the provider is associated with high return rates, the attribute is 1, else the attribute is 0. Other example attributes are "is in bad market", which may be normalized such that if the provider is located in a location and/or hyper local region associated with high return rates, the attribute is 1, else the attribute is 0. Another example feature is "average price for sub-category" and "number of website provider has rating".

Additionally or alternatively, one embodiment may include at least one of "years_in_file" indicating the number of years a provider has been in business, "judgment count" indicating a number of judgments, "median credit" indicating a median credit score, and/or "provider stability risk score" indicating a provider's stability risk score. In another example embodiment, additional features may include demographic features, such as census data. For example, demographic features related to income, education level, ethnicity, etc. in a location and/or hyper local region that the business is located.

Identifying Determinative Attribute Data

In one embodiment, determinative attribute data is identified. In one example embodiment, one or more machines, such as those discussed in FIGS. 2, 3, and 7, may be configured to perform a process of selecting the most significant features by performing one or more different feature selection approaches. These approaches may be (1) forward selection, which is starting with the most significant feature and adding a next significant feature until the model gets stable; (2) backward elimination, which starts with all the features and exclude the non-significant features one by one until model is stable; (3) a combination of forward selection and backward elimination; and (4) checking the significance of the feature by statistical model (regression). In one embodiment, each feature selection approach may give a subset of significant features. The features that are not shown to be significant by one or more of the feature selection approaches may be excluded from the model. Feature selection processes may be utilized when there are more features than needed that are available, particularly in the external dataset.

Promotion and Marketing System

Figure 7:
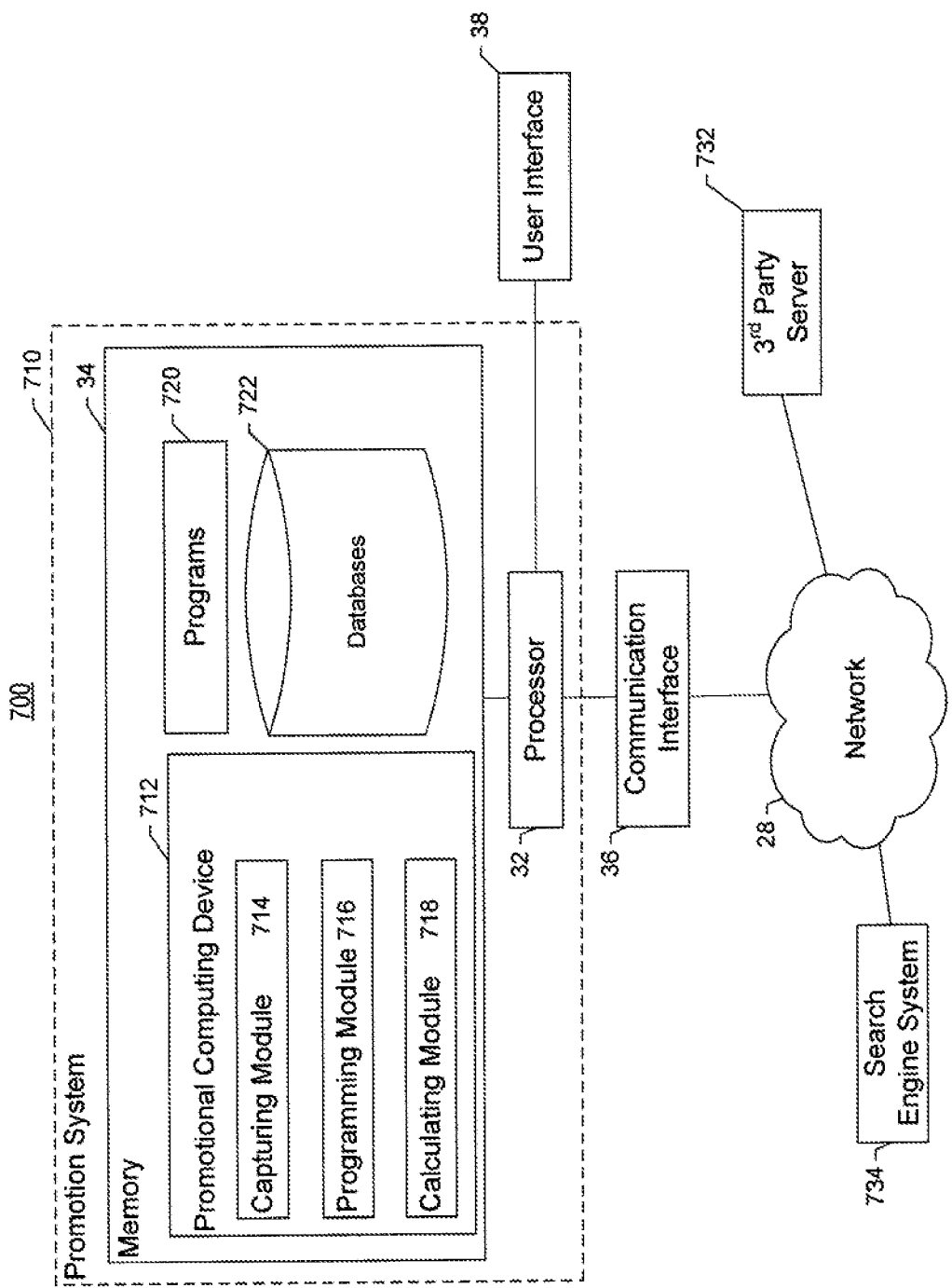
FIG. 7 is block diagram of a system that may be specifically configured in accordance with an example embodiment of the present invention.

FIG. 7 illustrates an example network architecture for a system in accordance with some embodiments discussed herein. System 700 may include one or more devices and sub-systems that are configured to implement some of the example embodiments discussed herein. For example, system 700 may include promotion system 710, which may include, for example, a processor 32, memory 34, a communications interface 36, and a user interface 38. Memory 34 may include promotional computing module 712.

Promotion system 710 can be coupled to a search engine system 734, a 3$^{rd}$ party server 732, via network 28. Promotion system 710 may additionally be coupled to one or more consumer devices and/or one or more provider devices via network 28

In this regard, network 28 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 28 may include a cellular telephone, an 802.11, 802.16, 802.20, and/or WiMax network. Further, the network 28 may include a public network, such as the Internet, a private network, such as an intranet, or combinations thereof, and may utilize a variety of networking protocols now available or later developed including, but not limited to TCP/IP based networking protocols. In one embodiment, promotion system 710 can be coupled to any consumer and/or provider devices directly via any wired or wireless communication network including, for example, a wired or wireless local area network (LAN), personal area network (PAN), metropolitan area network (MAN), wide area network (WAN), or the like, as well as any hardware, software and/or firmware required to implement it.

Consumer devices and/or provider devices may each be implemented as a personal computer and/or other networked device, such as a cellular phone, a "smartphone", a tablet computer, mobile device, etc., that may be used for any suitable purpose in addition to buying or selling offers.

Memory 34 of promotion system 710 may include promotional computing module 712, and/or other programs 720 and data repositories 722. Promotional computing module 712 can be any suitable network server and/or other type of processing device. The programs 720 and data repositories 722 may be any suitable network database configured to store offer parameter data, consumer account information, provider account information and/or analytics data, such as that discussed herein. In this regard, promotion system 710 may include, for example, at least one backend data server, network database, cloud computing device, among other things.

Regarding promotion system 710, FIG. 7 shows a schematic block diagram of circuitry, some or all of which may be included. As illustrated in FIG. 7, in accordance with some example embodiments, the circuitry can includes various means, such as processor 32, memory 34, communications interface 36, and/or user interface 38. As referred to herein, "module" includes hardware, software and/or firmware configured to perform one or more particular functions. In this regard, the means of the provider device's circuitry as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 34) that is executable by a suitably configured processing device (e.g., processor 32), or some combination thereof.

In addition, promotion system 710 may comprise one or more distinct computing systems/devices and may span distributed locations. In other example embodiments, a pre-processing module or other module that requires heavy computational load may be configured to perform that computational load and thus may be on a remote device or server. Furthermore, each block shown may represent one or more such blocks as appropriate to a specific example embodiment. In some cases one or more of the blocks may be combined with other blocks.

Processor 32 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 3 as a single processor, in some embodiments, processor 32 comprises a plurality of processors. The plurality of processors may be embodied on a single computing device or may be distributed across a plurality of computing devices collectively. The plurality of processors may be in operative communication with each other and may be collectively configured to perform one or more functionalities of promotion system 710 as described herein. In an example embodiment, processor 32 is configured to execute instructions stored in memory 34 or otherwise accessible to processor 32. These instructions, when executed by processor 32, may cause promotion system 710 to perform one or more of the functionalities as described herein.

Whether configured by hardware, firmware/software methods, or by a combination thereof, processor 32 may comprise an entity capable of performing operations according to embodiments of the present invention while configured accordingly. Thus, for example, when processor 32 is embodied as an ASIC, FPGA or the like, processor 32 may comprise specifically configured hardware for conducting one or more operations described herein. Alternatively, as another example, when processor 32 is embodied as an executor of instructions, such as may be stored in memory 34, the instructions may specifically configure processor 32 to perform one or more algorithms and operations described herein, such as those discussed in connection with FIGS. 1, 4, 5, 6, and 7.

Memory 34 may comprise, for example, volatile memory, non-volatile memory, or some combination thereof. Although illustrated in FIG. 3 as a single memory, memory 34 may comprise a plurality of memory components. The plurality of memory components may be embodied on a single computing device or distributed across a plurality of computing devices. In various embodiments, memory 34 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 34 may be configured to store information, data (including offer parameter data, consumer data, inventory data and/or analytics data), applications, instructions, or the like for enabling promotion system 710 to carry out various functions in accordance with example embodiments of the present invention. For example, in at least some embodiments, memory 34 is configured to buffer input data for processing by processor 32. Alternatively or additionally, in at least some embodiments, memory 34 is configured to store program instructions for execution by processor 32. Memory 34 may store information in the form of static and/or dynamic information.

Communications interface 36 may be embodied as any device or means embodied in circuitry, hardware, a computer program product comprising computer readable program instructions stored on a computer readable medium (e.g., memory 34) and executed by a processing device (e.g., processor 32), or a combination thereof that is configured to receive and/or transmit data from/to another device, such as, for example, a consumer device, a provider device and/or the like. In some embodiments, communications interface 36 (like other components discussed herein) can be at least partially embodied as or otherwise controlled by processor 32. In this regard, communications interface 36 may be in communication with processor 32, such as via a bus. Communications interface 36 may include, for example, an antenna, a transmitter, a receiver, a transceiver, network interface card and/or supporting hardware and/or firmware/software for enabling communications with another computing device. Communications interface 36 may be configured to receive and/or transmit any data that may be stored by memory 34 using any protocol that may be used for communications between computing devices. Communications interface 36 may, alternatively or additionally, be in communication with the memory 34, user interface 38 and/or any other component of promotion system 710, such as via a bus.

User interface 38 may be in communication with processor 302 to receive an indication of a user input and/or to provide an audible, visual, mechanical, or other output to a user (e.g., provider and/or consumer). As such, user interface 38 may include support, for example, for a keyboard, a mouse, a joystick, a display, a touch screen display, a microphone, a speaker, a RFID reader, credit card reader, barcode reader, biometric scanner, and/or other input/output mechanisms as represented by 308. User interface 38 may be in communication with the memory 34, communications interface 36, and/or any other component(s), such as via a bus. Although more than one input/output module and/or other component can be included in promotion system 710, only one is shown in FIG. 7 to avoid overcomplicating the drawing (like the other components discussed herein).

FIG. 7 also shows an example circuitry that may be included in promotional computing module 712, which may be configured to perform the detection, capturing, analysis, calculation, management and/or other functionality discussed in connection with promotion system 710. In this manner, from the provider's perspective, promotional computing module 712 may provide cloud computing functionality and services to the provider. As illustrated in FIG. 7 and in accordance with some example embodiments, promotional computing module 712 can includes various means, such as capturing module 714, programming module 716 and/or calculating module 718.

Capturing module 714 may be included and configured to perform the functionality discussed herein related to accessing a network or the world wide web (WWW) and/or capturing review information from a network, the WWW, and/or a database. In order to capture review information, capturing module 714 may be configured to determine locations and/or formats of review information. In some embodiments, some or all of the functionality of capturing module 714 may be performed by processor 32. In this regard, the example processes and algorithms discussed herein can be performed by at least one processor 32 and/or capturing module 714. For example, non-transitory computer readable media can be configured to store firmware, one or more application programs, and/or other software, which include instructions and other computer-readable program code portions that can be executed to control each processor (e.g., processor 32 and/or capturing module 714) of the components of promotional computing module 712 to implement various operations, including the examples shown above. As such, a series of computer-readable program code portions are embodied in one or more computer program products and can be used, with a computing device, server, and/or other programmable apparatus, to produce machine-implemented processes.

Programming module 716 can be configured for receiving raw data, generating attribute data; training a machine learning algorithm, such as SVM, decision tree learning, association rule learning, artificial neural networking, inductive logic programming, clustering, or the like, and testing the machine learning algorithm (e.g., FIG. 4).

Calculating module 718 may be configured to assign, calculate or determine a provider return rate. Furthermore, the calculating module 718 can be configured to correlate attribute data to a return rate, trim attribute data that is indeterminate of a return rate and/or selectively utilize attribute to optimize or improve the classifying model in conjunction with the programming module 716 (e.g., FIG. 5).

In some example embodiments, the method, apparatus and computer program product described herein are configured to generate sales closing metrics for one or more sales leads. In some example embodiments, one or more sales leads may be provided to or otherwise generated by a promotional system for use by a promotion service (e.g, a service that provides promotion and/or marketing services on behalf of one or more providers that are offering one or more instruments that are redeemable for goods, services, experiences and/or the like by a consumer). In some examples, the closing metrics are indicative of the probability, time and/or the like that the promotional system can close a contract to offer a promotion (e.g., any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion) with a provider (e.g, a merchant, business owner, consigner, shopkeeper, tradesperson, vender, operator, entrepreneur, agent, dealer, organization or the like that is in the business of a providing a good, service or experience to a consumer, facilitating the provision of a goods, service or experience to a consumer and/or otherwise operating in the stream of commerce).

Figure 8:
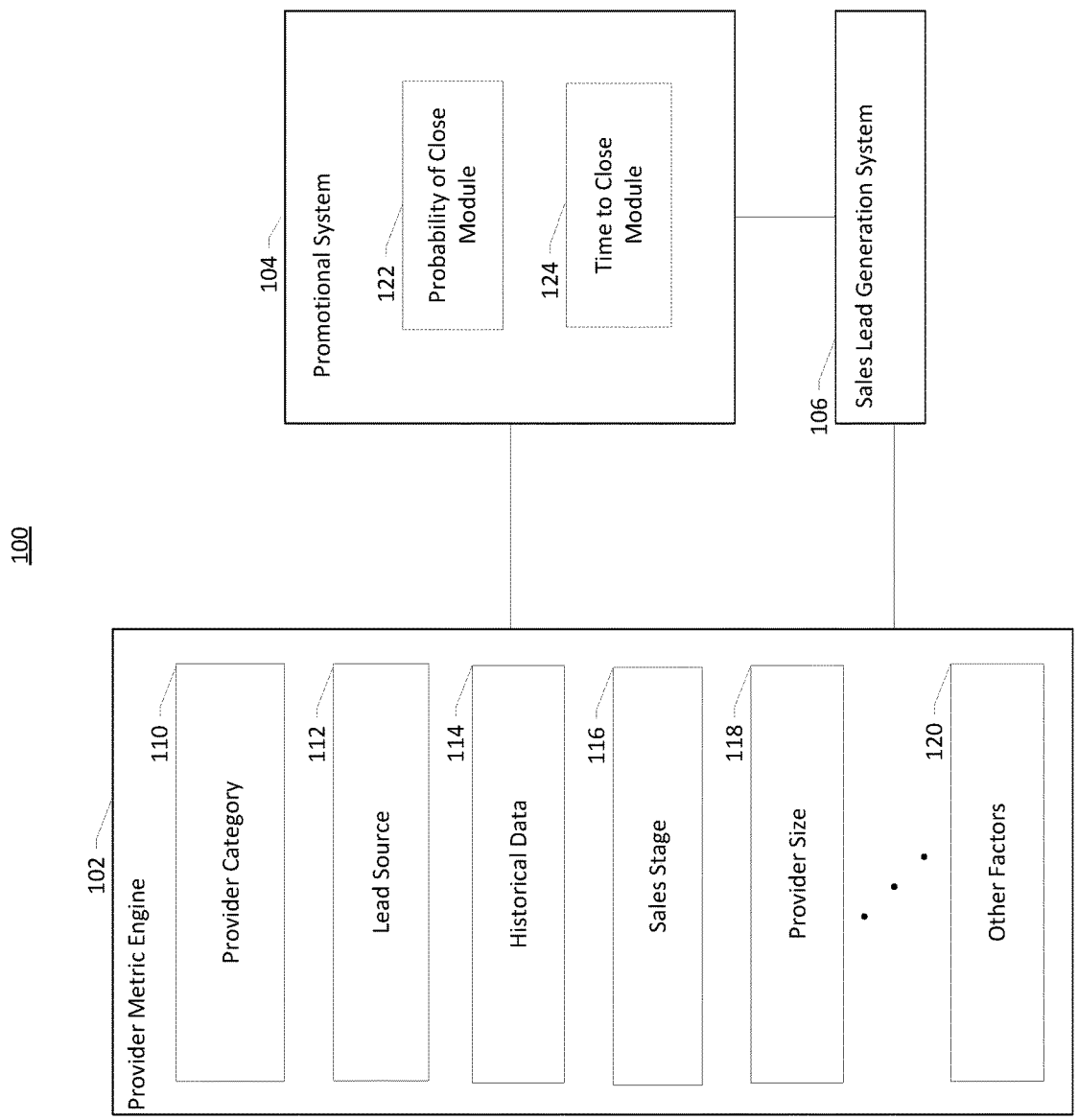
FIG. 8 is a is a schematic representation of a promotion service environment that may benefit from some example embodiments of the present invention, according to an example embodiment.

FIG. 8 is a schematic representation of a promotion service environment that may benefit from some example embodiments of the present invention, according to an example embodiment. A promotion service may include a business, organizational entity, or the like, who may partner with a providers to offer one or more instruments that are redeemable for goods, services, experiences and/or the like. The promotion service may offer its services via a promotional system 710, accessible via one or more computing devices. In some example embodiments, a promotional system 710 embodies or is in communication with a provider metric engine 102 and a sales lead generation engine 106. The components of the promotion service environment 100 are configured to provide various logic (e.g. code, instructions, functions, routines and/or the like) and/or services related to the promotional system 710.

In some examples, the promotional system 710 may be configured to receive a sales lead comprising an indication of a provider, and at least one of a provider category, a lead source, or historical data relating to the one or more providers. A sales lead may, in some embodiments, be generated by the promotional system 710 itself, provided by the sales lead generation system 106, or received from a third party system or the like. The sales lead may include any of a provider name, an individual contact at the provider (e.g., manager), address, category and/or subcategory of the provider and/or services offered by the provider (such as food and drink, or salon services) and/or the like. Additionally or alternatively, in some embodiments, the sales lead may include information regarding a specific promotion with which to target the provider. As such, the sales lead may include a promotion specifically designed for the provider, or a provider may be specifically targeted to honor a preconceived promotion. The information described above, such as the provider category, lead source, and/or historical data is provided as example data that may be included in a sales lead, and in some embodiments other information related to a provider may be included.

In some example embodiments, the provider metric engine may be configured to receive, calculate or otherwise generate a series of metrics about a providers, a good, a service, an experience, a category, a sub-category, a location, a time period and/or the like. In some examples, those metrics may include, but are not limited to a provider category 110, a lead source 112, historical data 114, a sales stage 116, a provider size 118, and/or other factors 120. These metrics and/or factors are described in further detail with respect to FIGS. 9B-9C.

In some embodiments, the promotional system 710 may include a probability to close module 122 and a time to close module 124. The probability to close module 122 may be configured to calculate a probability of close. In some examples, a probability to close indicates the probability that a particular provider of the one or more providers will contract with a promotion service to offer a promotion, wherein the promotion is offered to a consumer for purchase from the promotion service in exchange for an instrument (e.g., any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences). For example, the promotional system 710 may then value or rank a sales lead accordingly. The promotional system 710 may additionally or alternatively prioritize communications with a provider associated with a higher probability of close. The calculation is described in further detail with respect to FIGS. 9A, 9B, and 10.

In some example embodiments, the time to close module 124 is configured to calculate an estimated time to close the contract between the particular provider and the promotion service. The time to close may be calculated as a number of days from a current date, or date of receipt of the sales lead, for example. The promotional system 710 may then value and or prioritize a sales lead accordingly. A sales lead with a shorter time to close may be valued higher, and/or prioritized higher than a sales lead with a longer time to close. Additional detail on calculating an estimated time to close is provided with respect to FIGS. 9A, 9C and 10.

Figure 9A:
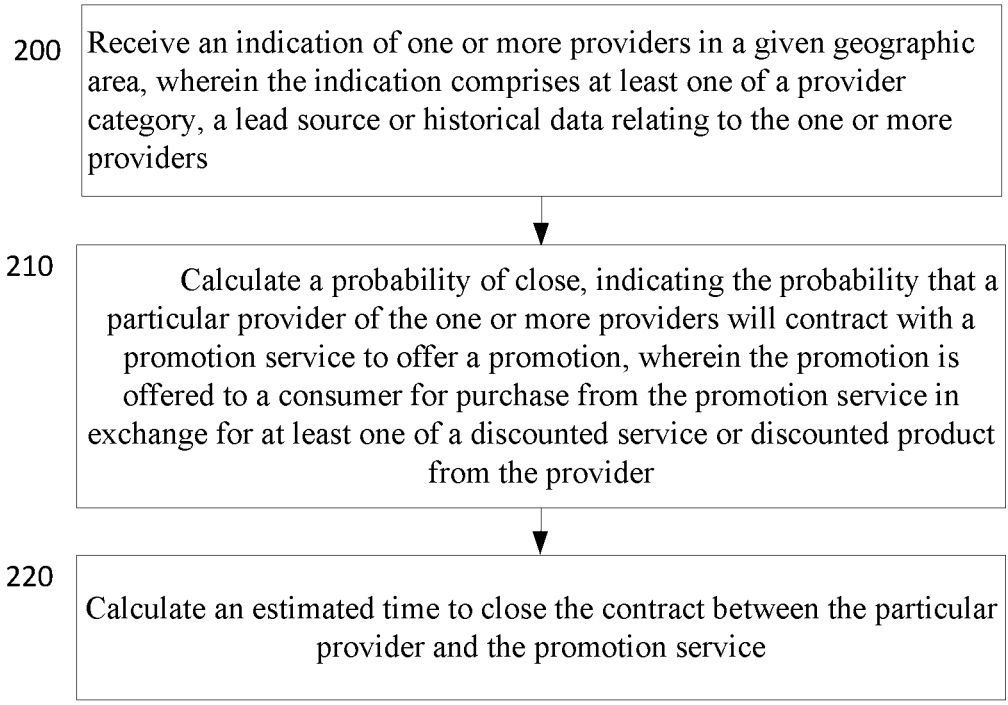
FIG. 9A is a flowchart illustrating operations for generating closing metrics according to an example embodiment.

FIG. 9A is a flowchart illustrating operations for generating closing metrics. At operation 200, the promotional system 710 may include means for receiving an indication of one or more providers in a given geographic area, wherein the indication comprises at least one of a provider category (such as provider category 110), a lead source (such as lead source 122), or historical data relating to the one or more providers (such as historical data 114).

A provider may, in some embodiments, be generated by the promotional system 710, sales lead generation system 106, and/or provider metric engine 102. In some embodiments, a sales lead and/or provider may be received from a third party system. In this regard, a sales lead may include any of a provider name, an individual contact at the provider (e.g., manager), address, category and/or subcategory of the provider and/or services offered by the provider (such as food and drink, or salon services), or any information used to identify a provider.

In some embodiments, the sales lead may be generated by or provided to the promotional system 710 to enable the promotion service to contract with the associated provider to offer a promotion. Therefore, as shown by operation 210, the promotional system 710 may include means, such as the probability of close module 122, for calculating a probability of close, indicating the probability that a particular provider of the one or more providers will contract with a promotion service to offer a promotion, wherein the promotion is offered to a consumer for purchase from the promotion service in exchange for at least one of a discounted service or discounted product from the provider. Having received the indication of a provider (e.g., a sales lead) in operation 200, the promotion service may have an interest in understanding the probability the promotion service can close a contract with the provider. The promotion service may then value a sales leads accordingly based on their respective probabilities of close. The promotion service may additionally or alternatively prioritize communications with a provider having a higher probability of close. The calculation is described in further detail with respect to FIGS. 9B and 10.

Continuing to operation 220, the promotional system 710 may include means, such as the time to close module 124, for calculating an estimated time to close the contract between the particular provider, or sales lead, and the promotion service. In this regard, the promotion service may consider it beneficial to calculate an estimated time to close. The time to close may be calculated as a number of days from a current date, or date of receipt of the sales lead, for example. The promotion service may then value and or prioritize a provider accordingly. In some embodiments, a sales lead with a shorter time to close may be valued and/or prioritized higher, than a sales lead with a longer time to close. In some embodiments, a sales lead having a longer time to close may be prioritized higher, so that a sales resource may initiate communication sooner and/or allow enough time to close the contract by a target date. Additional detail on calculating an estimated time to close is provided with respect to FIGS. 9C and 10.

Figure 9B:
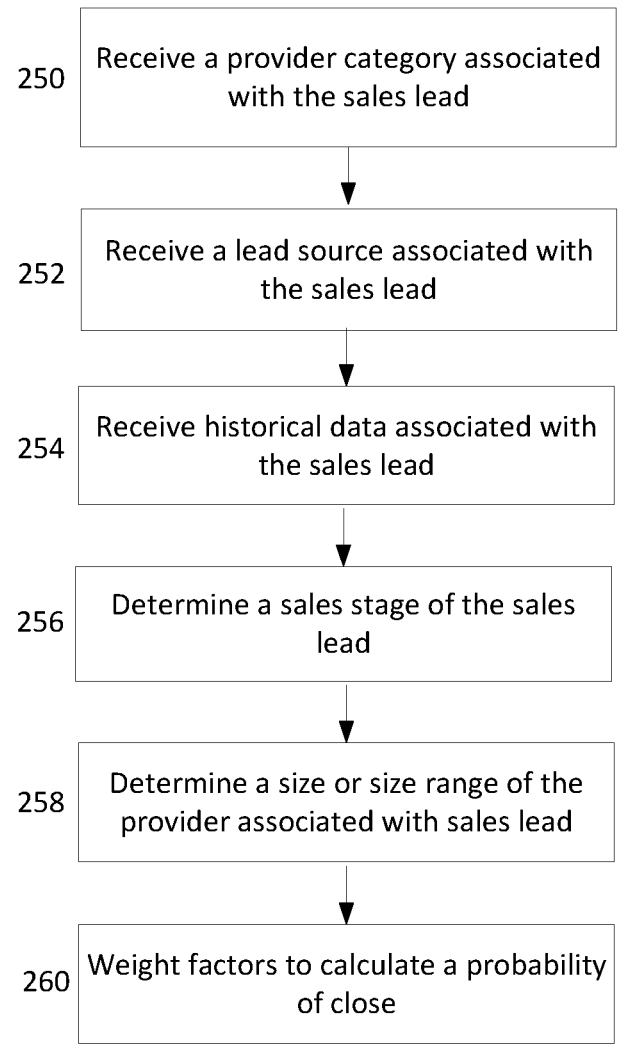
FIG. 9B is a flowchart illustrating operations for calculating a probability of close based on a sales lead, according to an example embodiment.

FIG. 9B is a flowchart illustrating operations for calculating a probability to close a contract between a provider and promotion service. The received indication of a provider (e.g. sales lead) referenced with respect to FIG. 9A, may be provided by the sales lead generation system 106, as described with respect to operation 200 of FIG. 9A. At operation 250, the promotional system 710 may include means for receiving a provider category associated with the sales lead, the provider category being received from the provider metric engine 102 and/or sales lead generation system 106, for example. In some embodiments, the provider category may be included with the sales lead, provided by the provider metric engine 102, or may be determined by the promotional system 710 based on a provider name, and/or type of service offered in an associated promotion.

In some examples, a particular category may have an associated score or probability indicating the probability of the promotion service closing a contract with a provider of the particular category. For example, the promotion service may be more likely to close a contract with providers in a food and drink category than with a provider in a spa and salon category. This may be for a variety of reasons including that in general, food and drink providers may be shown to benefit more from honoring a promotion than spa and salon providers, causing the food and drink provider to be more willing into a contract to honor a promotion. In some examples, categorical differences impact a probability to close calculation differently, depending on the market and/or geographic area. The above comparisons are provided as example, and it will be appreciated that the promotional system 710 may determine a probability to close a contract based on a provider category, using a variety of methods. The probability to close may then be calculated based on the provider category alone, and/or in combination with other factors, such as those metrics described below with respect to operations 252-260.

Continuing to operation 252, the promotional system 710 may include means for receiving a lead source associated with the sales lead. In this regard, the lead source may be received with the sales lead information from the sales lead generation system 106 and/or provider metric engine 102, and/or determined by the promotional system 710. For example, in some embodiments, the sales lead generation system 106 may comprise a module for crawling various yellow page or similar sites, and generating sales leads from providers it identifies. These providers (and associated sales leads) may have a lead source referred to as "cold call," because no previous business relationship may exist between the promotion service and the provider. In some embodiments, sales leads may be provided by a third party system, such as a marketing and data collection agency. As such, the lead source may be "third party." "Repeat provider" may refer to a lead source of a provider already having offered promotions with the promotion service, for which an additional sales lead has been generated. In some embodiments, the provider may contact the promotion service via the promotional system 710 (e.g., a website hosted by the promotional system 710) for assistance in offering a promotion. Such sales leads may have an associated lead source of "web to lead." As such, a sales lead having a lead source as "web to lead" may have a higher probability of close than a "cold call" or "third party" sales lead, because the provider associated with the "web to lead" lead source may have actively expressed interest in partnering with the promotion service, whereas the "cold call" and/or "third party" sales lead may have no known interest in partnering with the promotion service. Additional lead source types may include "internal research teams" and "competitive intelligence." Additionally or alternatively, a free form text may be provided as a lead source, such as "my cousin Joe owns the business." As with other factors described herein, the probability of close module 122 may use the lead source to determine a probability to close, and may be considered independently, or in addition to other variables, such as those described with respect to FIG. 9B.

At operation 254, the promotional system 710 may include means for receiving historical data associated with the sales lead. In some embodiments, the historical data may be received from the provider metric engine 102 and/or the sales lead generation system 106, and may comprise information regarding past contracts between the provider and promotion service, such as the quantity of instruments made available, the quantity of instruments sold, the service or type of service offered, and/or generated revenue for the provider, for example. As such, the promotional system 710, with the probability of close module 122, may determine that a provider who has contracted with the promotion service in the past may have a higher probability of close than a provider who has not. In some embodiments, the historical data may be analyzed in further detail, where a provider associated with a past promotion deemed to be successful (e.g., having a fast sellout rate), may have a higher probability of close than a provider associated with a past promotion that was not as successful (e.g., having a low sales rate). As such, additional factors may be considered, such as total dollars of instruments sold, and/or total dollars of generating revenue, the number of refunds and/or dollars of refunds, deal efficiency, demand forecast, and/or customer ratings, among others. In some embodiments, a merchant quality score may be calculated based on any of the above variables and/or other variables relating to the merchant. The merchant quality score may additionally or alternatively be used in calculating a probability of close. In some embodiments, a merchant quality score may not be used in a probability of close calculation, but may nevertheless be used in ranking sales leads. In some embodiments, a merchant quality score may not be used in a probability to close calculation, nor a ranking of sales leads.

Further, in some embodiments, such as those in which the provider is received from a third party system, the historical data may comprise information indication the provider has offered promotions independently or via other third parties, but not necessarily the promotion service. Evidence of other promotion participation may, however, serve as an indication of likelihood of the provider contracting with the promotion services as a means of expanding their business. The probability of close module 122 may consider the historical data independently, or along with other variables impacting a probability of close.

Continuing to operation 256, the promotional system 710 may include means for receiving a sales stage of the sales lead. The sales stage may be determined by the promotional system 710 by accessing records of communication with the provider, and/or accessing the sales stage in a promotional database, for example. Additionally or alternatively, the sales stage may be provided by the provider metric engine 102 and/or sales lead generation system 106. As described above, example sales stages may include "not wanted," "unknown," "un-contacted," "contacted," "negotiating," "contract sent," "closed," or "decision maker contacted." The promotional system 710, with the probability of close module 122, may therefore calculate a probability of close based on the sales stage. For example, a sales lead having a sales stage of "contract sent," indicating a verbal agreement was reached, and a written contract was mailed, may have a significantly higher probability of close, than a sales lead having a sales stage of "un-contacted," meaning the promotion service has not yet contacted the provider regarding a contract to offer a promotion. Again, the probability of close module 122 may consider the sales stage independently, or together with other factors, in calculating a probability of close.

As shown by operation 258, the promotional system 710 may include means for determining a size or size range of the provider associated with the sales lead. The size or size range may be provided by the provider metric engine 102, and/or the sales lead generation system 106. The promotional system 710, with the probability of close module 122, may determine a probability of close based on the size or size range of the provider. For example, a contract with a small business may have a higher probability of closing than a large corporation, due to a lower number of individuals to obtain approval from. The probability of close module 122 may additionally consider the perceived benefit to the provider. A small business may be a startup that may benefit more from the promotion, whereas a larger corporation may already be well-established and may not necessarily be seeking additional marketing and/or promotional assistance. In some embodiments, a larger provider may have a higher probability of close due to its ability to participate in a relatively inexpensive promotion compared to its large scale budget and expenditures.

Additionally or alternatively, in some embodiments, the sales lead may include information regarding a specific promotion with which to target the provider. As such, the sales lead may include a promotion specifically designed for the provider, or a provider may be specifically targeted to honor a preconceived promotion. The information described above, such as the provider category, lead source, and/or historical data is provided as example data that may be included in a sales lead, and in some embodiments other information related to a provider may be included.

As shown by operation 260, the promotional system 710 may include means, such as the probability of close module 122, for weighting factors described above (e.g., provider category, lead source, historical data, sales stage, provider size) to calculate a probability of close. In some embodiments, the sales stage may therefore carry the most weight in determining a probability of close, the lead source may carry less weight, and other factors may not be considered at all. In some embodiments, the weight may be distributed to any number of factors equally, or in any proportion determined by the promotional system 710 and/or probability of close module 122.

Additionally or alternatively, in some embodiments, the probability of close module 122 may determine a probability of close relative to a specified time period. For example, a sales lead may have a 30-day, 60-day, and/or 90-day probability to close. Each calculation may be different and may indicate the probability of closing the contract with the specified number of days. The calculations may be dependent on another probability to close calculation, or may be calculated independently from one another.

Figure 9C:
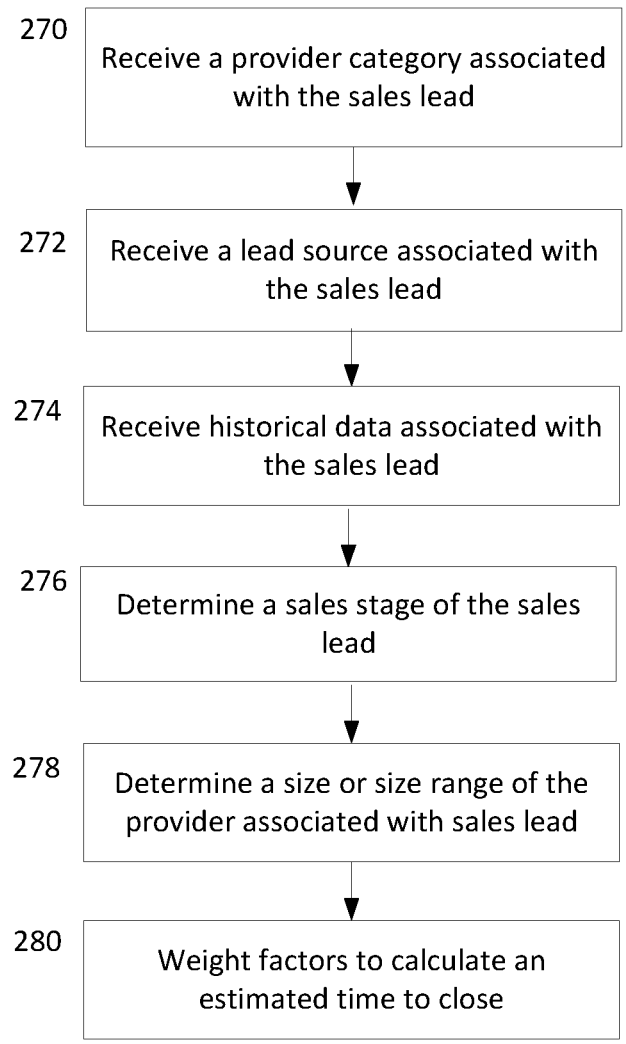
FIG. 9C is a flowchart illustrating operations for calculating an estimated time to close based on a sales lead, according to an example embodiment.

FIG. 9C is a flowchart illustrating operations for estimating a time to close a contract between the received sales lead and the promotion service. The received sales lead referenced with respect to FIG. 9C may be provided by the sales lead generated system 106, as described with respect to operation 200 of FIG. 9A. In some embodiments, the received sales lead may be the same sales lead described with respect to FIG. 9B, for which a probability of close is calculated. In some embodiments, an assumption may be made by the time to close module 124 that the contract will close, and the time to close module 124 may disregard any probability of close calculations associated with a provider and/or sales lead. At operation 270, the promotional system 710 may include means for receiving a provider category associated with the sales lead, the provider category being received from the provider metric engine 102 and/or sales lead generation system 106, for example. In some embodiments, the provider category may be included with the sales lead, provided by the provider metric engine 102, or may be determined by the promotional system 710 based on a provider name, and/or type of service included in an associated promotion.

In some examples, a particular category may have an associated time to close indicating an estimated amount of time needed to close a contract with a provider of the particular category. For example, the promotion service may quickly close a contract with providers in a food and drink category compared to a provider in a spa and salon category. This may be for a variety of reasons including that in general, food and drink providers are shown to benefit more from honoring a promotion than spa and salon providers, causing the food and drink provider to more quickly enter into a contract to honor a promotion. This comparison is provided as an example, and it will be appreciated that the promotional system 710 may determine an estimate time to close based on a provider category, using a variety of methods. The estimated time to close may then be calculated based on the provider category alone, and/or in combination with other factors, such as those factors described below with respect to operations 272-280.

Continuing to operation 272, the promotional system 710 may include means for receiving a lead source associated with the sales lead. In this regard, the lead source may be received with the sales lead information from the sales lead generation system 106 and/or provider metric engine 102, and/or determined by the promotional system 710. A sales lead having a lead source as "web to lead" may have a shorter estimated time to close than a "cold call" or "third party" sales lead, because the provider associated with the "web to lead" lead source may have already expressed interest in partnering with the promotion service, whereas the "cold call" and/or "third party" sales lead may have no known interest in partnering with the promotion service. As with other factors described herein, the time to close module 124 may use the lead source to estimate a time to close, and may be considered independently, or in addition to other metrics, such as those described with respect to FIG. 9C.

At operation 274, the promotional system 710 may include means for receiving historical data associated with the sales lead. As described above, the historical data may be received from the provider metric engine 102 and/or the sales lead generation system 106, and may comprise information regarding past contracts between the provider and promotion service, such as the quantity of instruments made available, the quantity of instruments sold, the service or type of service offered, and/or generated revenue for the provider, for example. As such, the promotional system 710, with the probability of close module 122, may determine that a provider who has contracted with the promotion service in the past may have a shorter estimated time to close than a provider who has not. In some embodiments, the historical data may be analyzed in further detail, where a provider associated with a past promotion deemed to be successful (e.g., having a fast sellout rate), may have a shorter estimated time to close than a provider associated with a past promotion that was not as successful (e.g., having a low sales rate). The historical data may be considered independently, or along with other variables impacting an estimated time to close calculation.

Continuing to operation 276, the promotional system 710 may include means for receiving a sales stage of the sales lead. The sales stage may be determined by the promotional system 710 by accessing records of communication with the provider, and/or accessing the sales stage in a promotional database, for example. Additionally or alternatively, the sales stage may be provided by the provider metric engine 102 and/or sales lead generation system 106. As described above, example sales stages may include "not wanted," "unknown," "un-contacted," "contacted," "negotiating," "contract sent," or "closed." The promotional system 710, with the time to close module 124, may therefore estimate a time to close based on the sales stage. For example, a sales lead having a sales stage of "contract sent," indicating a verbal agreement was reached, and a written contract was mailed, may have a significantly shorter time to close, than a sales lead having a sales stage of "un-contacted," meaning the promotion service has not yet contacted the provider regarding a contract to offer a promotion. Again, the time to close module 124 may consider the sales stage independently, or together with other factors, in estimating a time to close.

As shown by operation 278, the promotional system 710 may include means for determining a size or size range of the provider associated with the sales lead. The size or size range may be provided by the provider metric engine 102, and/or the sales lead generation system 106. The promotional system 710, with the time to close module 124, may calculate an estimated time to close based on the size or size range of the provider. For example, a small business may have a shorter time to close than a large corporation, due to a lower number of contacts to obtain approval from. Time to close module 124 may additionally consider the perceived benefit to the provider. A small business may be a startup that may benefit more from the promotion and may be quicker to enter into a contract, whereas a larger corporation may already be well-established and may not necessarily be seeking additional marketing and/or promotional assistance.

Continuing to operation 280, the promotional system 710 may include means, such as the time to close module 124, for weighting factors to calculate an estimated time to close. Similar to the weighting of factors for calculating a probability of close, various factors may be weighted differently by the promotional system 710 and/or time to close module 124 in calculating an estimated time to close a contract. In some embodiments, in calculating an estimated time to close, the promotional system 710 may do so under the assumption that the contract will close (and disregard any probability of close calculations). The estimated time to close may therefore be an estimate of the remaining time needed to close the contract, and/or the amount of time needed from receipt of the sales lead. The time may be measured in days, months, or years for example. In some embodiments, an estimated time to close may be dependent on a probability of close calculation, or a probability of close calculation may be dependent on an estimated time to close calculation. In some embodiments, the probability of close and estimated time to close may be calculated independently from one another.

Figure 10:
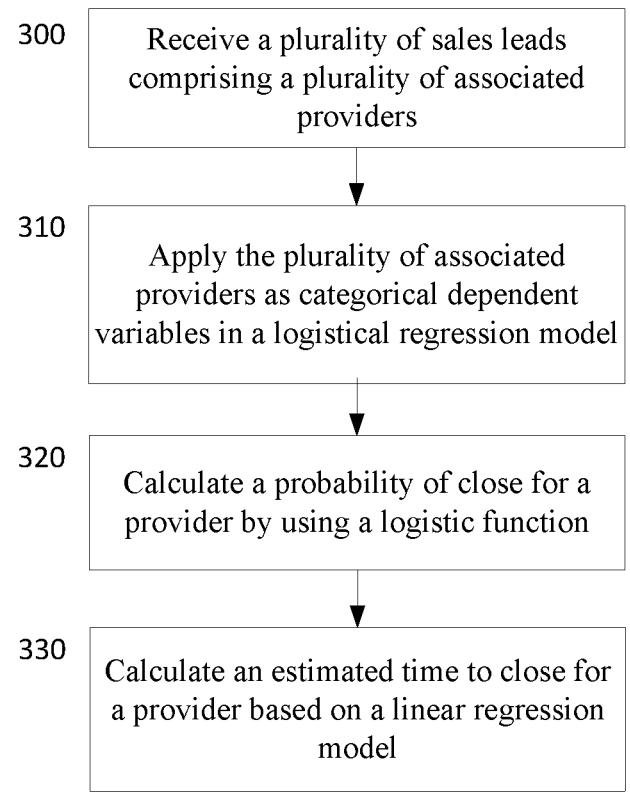
FIG. 10 is a flowchart illustrating operations for calculating closing metrics using statistical modeling, according to an example embodiment.

FIG. 10 is a flowchart illustrating operations for calculating a probability of close and/or an estimated time to close using statistical modeling, such as a logistical regression model, profit model, logit model or skewed logit model, to name a few. At operation 300, the promotional system 710 may include means for receiving a plurality of sales leads comprising a plurality of associated providers. As described with respect to operation 100, the sales leads may be received from a third party system and/or may be generated internally on the promotional system 710. Some sales leads may have closed contracts associated with them and may be used as predictive indicators as described in further detail below.

At operation 310, the promotional system 710 may include means for applying the plurality of associated providers as categorical dependent variables in a logistical regression model. As such, any of the factors used to calculate a probability of close and/or estimate a time to close, such as those described with respect to FIG. 9, may be considered categorical dependent variables, by which a provider may be grouped. For example, using historical data, the providers may be assigned to a category such as "no promotional history," "provided promotion with sales between 1-500," and "provided promotion with sales in excess of 500." Additionally or alternatively, the providers may be categorized based on the lead source such as "cold call," "web to lead," "third party," or "repeat provider," as described above. Any or all of the metrics relating to a provider may be considered a categorical dependent variable in a logistical regression model.

Continuing to operation 320, the promotional system 710 may calculate a probability of close a provider by using a logistic function. As such, in calculating a probability of close for a particular provider, the promotional system 710 may consider other providers as predictive indicators based on their categorical dependencies as inputs to a logistic function. A resulting probability of close for a particular provider may therefore be the same or similar to that of a provider having the same or similar categorical dependencies.

In some embodiments, at operation 330, the promotional system 710 may calculate an estimated time to close for the at least one provider based on a linear regression model. As such, the promotional system 710 may calculate a quantitative variable representative of the estimated time to close, for a particular provider. Historical data for various other providers may include the provider's respective time to close with respect to previous contracts. The promotional system 710 may therefore perform a linear regression analysis to estimate a time to close for a provider, based on other providers having similar or the same categorical dependencies.

Figure 11:
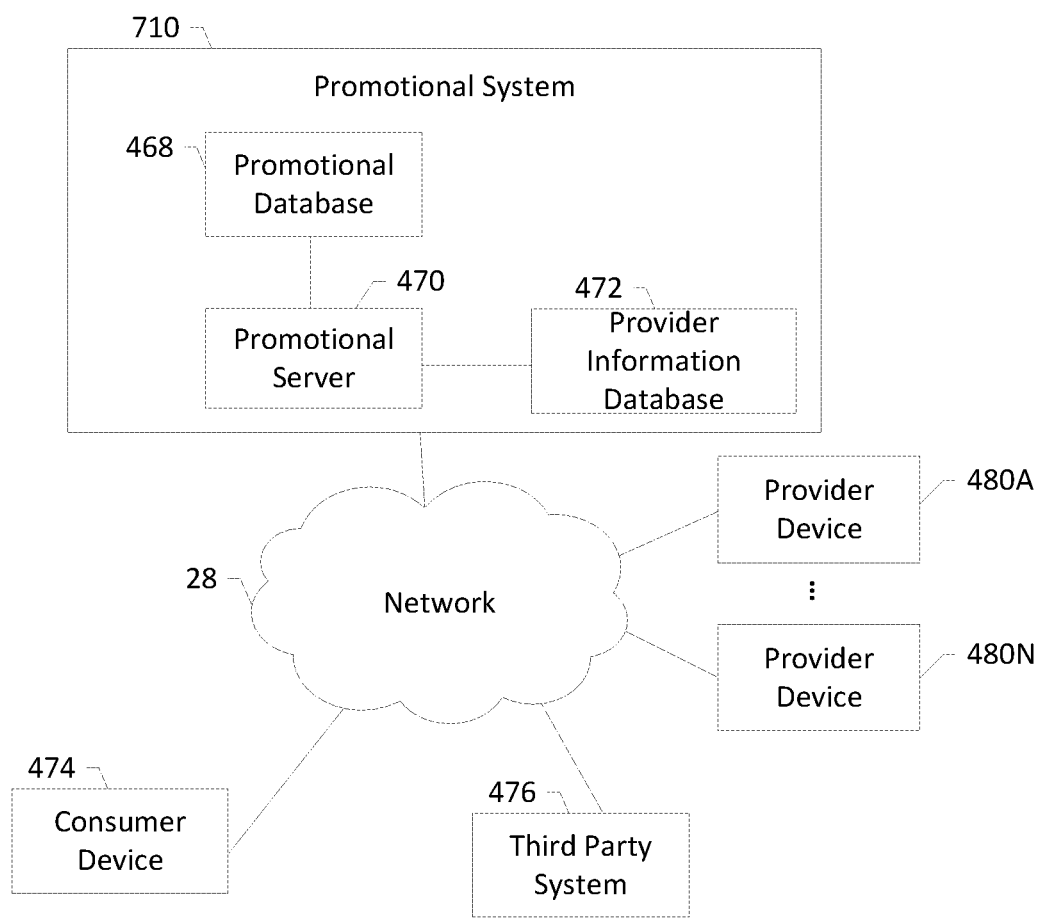
FIG. 11 shows an example system in accordance with some example embodiments discussed herein.
Figure 12:
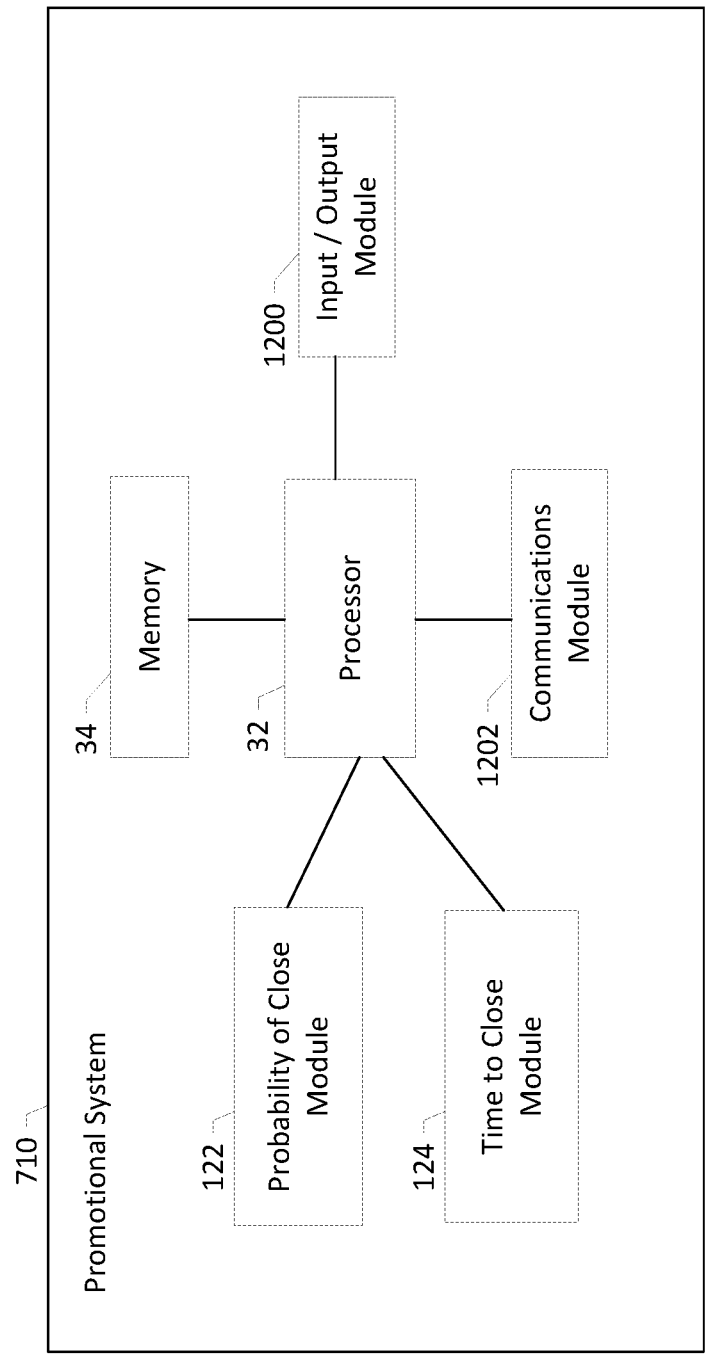
FIG. 12 shows a schematic block diagram of a promotional system in accordance with some example embodiments discussed herein.

Having now described operations performed by a promotional system 710 to calculate a probability of close and/or a time to close, FIGS. 11 and 12 describe in further detail the systems and corresponding components configured to perform such operations. As such, FIGS. 11 and 12 are example implementations of the promotion service environment 100. FIG. 11 is an example system according to some example embodiments. Promotional system 710 can include, for example, promotional server 470, promotional database 468, and provider information database 472, among other things (not shown).

Promotional server 470 can be any suitable network server and/or other type of processing device, configured to manage operations of the promotional system 710 and process data received from the promotional database 468 and/or provider information database 472. The promotional server 470 may additionally or alternatively process incoming data to the promotional system 710. Promotional database 468 may be any suitable network database configured to store data regarding promotions and promotion transaction history, such as that discussed herein. Provider information database 472 may be any suitable network database configured to store data regarding providers, such as those associated with sales leads. A provider may therefore be currently associated with promotions offered on the promotional system 710, or may be considered a new sales lead for the promotional system 710. In some embodiments, the provider information database 472 may be configured to receive provider information from a third party system 476, or provider device 420. In some embodiments, the provider information database 472 may be implemented on the same device as the promotional database 468. In this regard, promotional system 710 may include, for example, at least one backend data server, network database, cloud computing device, among other things.

Promotional system 710 may be coupled to one or more provider devices 420A-420N via network 416. In this regard, network 416 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 416 may include a cellular telephone, an 802.11, 802.16, 802.20, and/or WiMax network. Further, the network 416 may include a public network, such as the Internet, a private network, such as an intranet, or combinations thereof, and may utilize a variety of networking protocols now available or later developed including, such as, but not limited to, TCP/IP based networking protocols.

Provider devices 420A-420N may be implemented as a personal computer and/or other networked device, such as a cellular phone, tablet computer, mobile device, etc., that may be used to access promotional system 710 in order to engage in communication with the promotional system 710 regarding a contract with a promotion service to honor a promotion, for example. In some embodiments, information regarding a provider may be transmitted from a provider device 420 to the promotional system 710, that may be used, for example to generate sales leads. The depiction in FIG. 11 of "N" provider devices is merely for illustration purposes.

Promotional system 710 may be configured to communicate with one or more consumer devices 474 via network 416. Consumer devices 474 may each be implemented as a personal computer and/or other networked device, such as a cellular phone, tablet computer, mobile device, etc., that may be used for accessing promotional system 710 in order to view and/or purchase promotions.

Promotional system 710 may also be communicative with at least one third party system 476, such as a credit card payment processing system, a social networking site, and/or a data collection system, among other things. In some embodiments the third party system 476 may provide provider information to promotional system 710, with which the promotional system 710 may generate sales leads. In some embodiments, sales leads may be transmitted to the promotional system 710 by the third party system 476. The third party system 476 may, in some embodiments, act as a provider of historical data, which the promotional system 710 may utilize to calculate a probability of close and/or estimate a time to close for a particular sales lead and/or associated provider.

FIG. 11 shows a schematic block diagram of promotional system 710. As illustrated in FIG. 11, in accordance with some example embodiments, promotional system 710 may include various means, such as one or more processors 32, memories 34, communications modules 1202, and/or input/output modules 1200. In some embodiments, the probability of close module 122 and time to close module 124 may be included. As referred to herein, the term "module" includes hardware, software and/or firmware configured to perform one or more particular functions. In this regard, promotional system 710 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 34) that is executable by a suitably configured processing device (e.g., processor 32), or some combination thereof.

Processor 32 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 11 as a single processor, in some embodiments, processor 32 comprises a plurality of processors. The plurality of processors may be embodied on a single computing device or may be distributed across a plurality of computing devices collectively configured to function as promotional system 710. The plurality of processors may be in operative communication with each other and may be collectively configured to perform one or more functionalities of promotional system 710 as described herein. In an example embodiment, processor 32 is configured to execute instructions stored in memory 34 or otherwise accessible to processor 32. These instructions, when executed by processor 32, may cause promotional system 710 to perform one or more of the functionalities of promotional system 710 as described herein.

Whether configured by hardware, firmware/software methods, or by a combination thereof, processor 32 may comprise an entity capable of performing operations according to embodiments of the present invention while configured accordingly. Thus, for example, when processor 32 is embodied as an ASIC, FPGA or the like, processor 32 may comprise specifically configured hardware for conducting one or more operations described herein. As another example, when processor 32 is embodied as an executor of instructions, such as may be stored in memory 34, the instructions may specifically configure processor 32 to perform one or more operations described herein, such as those discussed in connection with FIGS. 9A-9C and 10.

Memory 34 may comprise, for example, volatile memory, non-volatile memory, or some combination thereof. Although illustrated in FIG. 11 as a single memory, memory 34 may comprise a plurality of memory components. The plurality of memory components may be embodied on a single computing device or distributed across a plurality of computing devices. In various embodiments, memory 34 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 34 may comprise promotional database 468 and/or provider information database 472. Memory 34 may be configured to store information, data (including user profile information, transaction history, promotion information, and/or analytics data), applications, instructions, or the like for enabling promotional system 710 to carry out various functions in accordance with example embodiments of the present invention. For example, in at least some embodiments, memory 34 is configured to buffer input data for processing by processor 32. Additionally or alternatively, memory 34 may be configured to store program instructions for execution by processor 32. Memory 34 may store information in the form of static and/or dynamic information. This stored information may be stored and/or used by promotional system 710 during the course of performing its functionalities.

Communications module 1202 may be embodied as any device or means embodied in circuitry, hardware, a computer program product comprising computer readable program instructions stored on a computer readable medium (e.g., memory 34) and executed by a processing device (e.g., processor 32), or a combination thereof that is configured to receive and/or transmit data from/to another device, such as, for example, a second promotional system 710 and/or the like. In some embodiments, communications module 1202 (like other components discussed herein) can be at least partially embodied as or otherwise controlled by processor 32. In this regard, communications module 1202 may be in communication with processor 32, such as via a bus. Communications module 1202 may include, for example, an antenna, a transmitter, a receiver, a transceiver, network interface card and/or supporting hardware and/or firmware/software for enabling communications with another computing device. Communications module 1202 may be configured to receive and/or transmit any data that may be stored by memory 34 using any protocol that may be used for communications between computing devices. Communications module 1202 may additionally or alternatively be in communication with the memory 34, input/output module 1200 and/or any other component of promotional system 710, such as via a bus.

Input/output module 1200 may be in communication with processor 32 to receive an indication of a user input and/or to provide an audible, visual, mechanical, or other output to a user (e.g., provider and/or consumer). As such, input/output module 1200 may include support, for example, for a keyboard, a mouse, a joystick, a display, a touch screen display, a microphone, a speaker, a RFID reader, barcode reader, biometric scanner, and/or other input/output mechanisms. In embodiments wherein promotional system 710 is embodied as a server or database, aspects of input/output module 1200 may be reduced as compared to embodiments where promotional system 710 is implemented as an end-user machine (e.g., consumer device and/or provider device) or other type of device designed for complex user interactions. In some embodiments (like other components discussed herein), input/output module 1200 may even be eliminated from promotional system 710. Alternatively, such as in embodiments wherein promotional system 710 is embodied as a server or database, at least some aspects of input/output module 1200 may be embodied on an apparatus used by a user that is in communication with promotional system 710, such as for example, provider device 420. Input/output module 1200 may be in communication with the memory 34, communications module 1202, and/or any other component(s), such as via a bus. Although more than one input/output module and/or other component can be included in promotional system 710, only one is shown in FIG. 11 to avoid overcomplicating the drawing (like the other components discussed herein).

The probability of close module 122 may provide functionality related to calculating a probability of close for a sales lead and/or provider, as described herein. In some embodiments, some or all of the functionality for calculating a probability of close may be performed by processor 32. In this regard, the example processes discussed herein can be performed by at least one processor 32 and/or probability of close module 122. For example, non-transitory computer readable storage media can be configured to store firmware, one or more application programs, and/or other software, which include instructions and other computer-readable program code portions that can be executed to control each processor (e.g., processor 32 and/or probability of close module 122) of the promotional system 710 to implement various operations, including the examples shown below. As such, a series of computer-readable program code portions are embodied in one or more computer program products and can be used, with a computing device, server, and/or other programmable apparatus, to produce machine-implemented processes.

The time to close module 124 may provide functionality related to estimating a time to close for a sales lead and/or provider, as described herein. In some embodiments, some or all of the functionality for estimating a time to close may be performed by processor 32. In this regard, the example processes discussed herein can be performed by at least one processor 32 and/or time to close module 124. For example, non-transitory computer readable storage media can be configured to store firmware, one or more application programs, and/or other software, which include instructions and other computer-readable program code portions that can be executed to control each processor (e.g., processor 32 and/or time to close module 124) of the promotional system 710 to implement various operations, including the examples shown below. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to at least:
   automatically perform at least one of automated forward selection, automated backward elimination, or a combination thereof on a classifying model to select a set of determinative attributes from attributes comprising a provider, a geographic area in which the respective provider is located, a provider category, a lead source, and historical data relating to the one or more providers, wherein the determinative attributes are selected by at least the processor based on which attributes stabilize the classifying model;
   train a set of classifying models to utilize the set of determinative attributes;
   supply the set of trained classifying models with a dataset, wherein the dataset comprises an indication of one or more providers in a given geographic area, a plurality of available attributes corresponding to the one or more providers wherein the available attributes comprise at least one of a provider category, a lead source or historical data relating to the one or more providers; and
   determine whether a probability of close with a particular provider is likely to satisfy a predetermined threshold, wherein the probability of close indicates the probability that the particular provider will contract with a promotion service to offer a promotion, wherein the promotion is offered to a consumer for purchase from the promotion service in exchange for at least one of a discounted service or discounted product from the provider;
   wherein the determination of whether the probability of close with the particular provider is likely to satisfy a predetermined threshold comprises:
   determining an availability of credit report data within the plurality of available attributes;
   in an instance in which the availability of credit report data is determined, utilizing a first classifying model from the set of trained classifying models;
   in an instance in which an unavailability of credit report data is determined, utilizing a second classifying model from the set of trained classifying models; and
   identifying one or more patterns of available attributes that match one or more patterns found in the set of determinative attributes,
   wherein each of one or more patterns is indicative of a known probability of close; and
   identifying which of two classes to assign the provider in accordance with the identified patterns,
   wherein a first class of the two classes is indicative of a determination that the probability of close with the provider is likely to satisfy the predetermined threshold and a second class of the two classes is indicative of a determination that the probability of close with the provider is not likely to satisfy the predetermined threshold.

2. The apparatus of claim 1, further comprising:
   calculating an estimated time to close the contract between the particular provider and the promotion service.

3. The apparatus of claim 1, wherein the at least one memory and the computer program code are further configured to, with the processor, cause the apparatus to at least:
   apply the one or more providers as categorical dependent variables, wherein the categorical dependent variables are established based on historical data.

4. The apparatus of claim 1, wherein the at least one memory and the computer program code are further configured to, with the processor, cause the apparatus to at least:
   determine a sales stage of an opportunity to contract offered by the promotion service to the provider, wherein the probability of close is based on at least the sales stage of the opportunity.

5. The apparatus of claim 1, wherein the probability of close is based on at least a source used to identify the particular provider.

6. The apparatus of claim 1, wherein the at least one memory and the computer program code are further configured to, with the processor, cause the apparatus to at least:
   analyze a history of previous contracts between the promotion service and the particular provider, wherein the probability of close is based on at least the history analysis.

7. The apparatus of claim 1, wherein the probability of close is calculated based on at least a category of the particular provider.

8. The apparatus of claim 1, wherein the probability of close is calculated based on at least one of a size of the particular provider, merchant quality score of the particular provider, or a demand forecast.

9. The apparatus of claim 1, wherein the probability of close is calculated relative to a specified time period.

10. A computer program product comprising at least one non-transitory computer-readable storage medium having computer-executable program code instructions stored therein, the computer-executable program code instructions comprising program code instructions to:
automatically perform at least one of automated forward selection, automated backward elimination, or combination thereof on a classifying model to select a set of determinative attributes from attributes comprising a provider, a geographic area in which the respective provider is located, a provider category, a lead source, and historical data relating to the one or more providers, wherein the determinative attributes are selected by at least the program code instructions based on which attributes stabilize the classifying model;
train a set of classifying models to utilize the set of determinative attributes;
supply the set of trained classifying models with a dataset, wherein the dataset comprises an indication of one or more providers in a given geographic area, a plurality of available attributes corresponding to the one or more providers wherein the available attributes comprise at least one of a provider category, a lead source or historical data relating to the one or more providers; and
determine whether a probability of close with a particular provider is likely to satisfy a predetermined threshold, wherein the probability of close indicates the probability that the particular provider will contract with a promotion service to offer a promotion, wherein the promotion is offered to a consumer for purchase from the promotion service in exchange for at least one of a discounted service or discounted product from the provider;
wherein the determination of whether the probability of close with the particular provider is likely to satisfy a predetermined threshold comprises:
determining an availability of credit report data within the plurality of available attributes;
in an instance in which the availability of credit report data is determined, utilizing a first classifying model from the set of trained classifying models;
in an instance in which an unavailability of credit report data is determined, utilizing a second classifying model from the set of trained classifying models; and
identifying one or more patterns of available attributes that match one or more patterns found in the set of determinative attributes,
wherein each of one or more patterns is indicative of a known probability of close; and
identifying which of two classes to assign the provider in accordance with the identified patterns,
wherein a first class of the two classes is indicative of a determination that the probability of close with the provider is likely to satisfy the predetermined threshold and a second class of the two classes is indicative of a determination that the probability of close with the provider is not likely to satisfy the predetermined threshold.

11. The computer program product of claim 10, wherein the computer-executable program code instructions further comprise program code instructions to:
calculate an estimated time to close the contract between the particular provider and the promotion service.

12. A method comprising:
automatically performing at least one of automated forward selection, automated backward elimination, or a combination thereof on a classifying model to select a set of determinative attributes from attributes comprising a provider, a geographic area in which the respective provider is located, a provider category, a lead source, and historical data relating to the one or more providers, wherein the determinative attributes are selected by at least a processor based on which attributes stabilize the classifying model;
training a set of classifying models to utilize the set of determinative attributes;
supplying the set of trained classifying models with a dataset, wherein the dataset comprises an indication of one or more providers in a given geographic area, a plurality of available attributes corresponding to the one or more providers wherein the available attributes comprise at least one of a provider category, a lead source or historical data relating to the one or more providers; and
determining whether a probability of close with a particular provider is likely to satisfy a predetermined threshold, wherein the probability of close indicates the probability that the particular provider will contract with a promotion service to offer a promotion, wherein the promotion is offered to a consumer for purchase from the promotion service in exchange for at least one of a discounted service or discounted product from the provider;
wherein the determination of whether the probability of close with the particular provider is likely to satisfy a predetermined threshold comprises:
determining an availability of credit report data within the plurality of available attributes;
in an instance in which the availability of credit report data is determined, utilizing a first classifying model from the set of trained classifying models;
in an instance in which an unavailability of credit report data is determined, utilizing a second classifying model from the set of trained classifying models; and
identifying one or more patterns of available attributes that match one or more patterns found in the set of determinative attributes,
wherein each of one or more patterns is indicative of a known probability of close; and
identifying which of two classes to assign the provider in accordance with the identified patterns,
wherein a first class of the two classes is indicative of a determination that the probability of close with the provider is likely to satisfy the predetermined threshold and a second class of the two classes is indicative of a determination that the probability of close with the provider is not likely to satisfy the predetermined threshold.

13. The method of claim 12, further comprising:
calculating an estimated time to close the contract between the particular provider and the promotion service.

14. A method according to claim 12, further comprising:
applying the one or more providers as categorical dependent variables, wherein the categorical dependent variables are established based on historical data.

15. A method according to claim 12, further comprising:
determining a sales stage of an opportunity to contract offered by the promotion service to the provider, wherein the probability of close is based on at least the sales stage of the opportunity.

16. A method according to claim 1, wherein the probability of close is based on at least a source used to identify the particular provider.

17. A method according to claim 12, further comprising:
analyzing a history of previous contracts between the promotion service and the particular provider, wherein the probability of close is based on at least the history analysis.

18. A method according to claim 12, wherein the probability of close is calculated based on at least a category of the particular provider.

19. A method according to claim 12, wherein the probability of close is calculated based on at least one of a size of the particular provider, merchant quality score of the particular provider, or a demand forecast.

20. A method according to claim 12, wherein the probability of close is calculated relative to a specified time period.

* * * * *